United States Patent [19]

Yamaguchi

[11] Patent Number: 5,446,851
[45] Date of Patent: Aug. 29, 1995

[54] INSTRUCTION SUPPLIER FOR A MICROPROCESSOR CAPABLE OF PREVENTING A FUNCTIONAL ERROR OPERATION

[75] Inventor: Seiji Yamaguchi, Hirakata, Japan

[73] Assignee: Matsushita Electric Industrial Co., Ltd., Osaka, Japan

[21] Appl. No.: 257,454

[22] Filed: Jun. 8, 1994

Related U.S. Application Data

[63] Continuation of Ser. No. 739,840, Aug. 2, 1991, abandoned.

[30] Foreign Application Priority Data

Aug. 3, 1990 [JP] Japan .................................. 2-207237

[51] Int. Cl.⁶ .............................................. G06F 11/00
[52] U.S. Cl. ..................................... 395/375; 364/265;
364/265.6; 364/266; 364/259.2; 364/DIG. 1
[58] Field of Search .................. 395/375, 800; 371/19,
371/25.1, 26

[56] References Cited

U.S. PATENT DOCUMENTS

| | | | |
|---|---|---|---|
| 4,587,612 | 5/1986 | Fisk | 395/500 |
| 4,701,847 | 10/1987 | Nichols | 395/375 |
| 4,763,255 | 8/1988 | Hopkins | 395/700 |
| 4,800,563 | 1/1989 | Itagaki | 371/13 |
| 4,814,976 | 3/1989 | Hansen | 395/375 |
| 4,999,837 | 3/1991 | Reynolds | 371/16.5 |
| 5,058,052 | 10/1991 | Sexton | 395/375 |
| 5,357,452 | 10/1994 | Pio-di-Savoia | 371/19 |

OTHER PUBLICATIONS

Model i486 ™ Microprocessor Manual, Published in Apr. 1989 by Intel Corporation (introductory page).

Primary Examiner—Eric Coleman
Attorney, Agent, or Firm—Wenderoth, Lind & Ponack

[57] ABSTRACT

An instruction supplier for a microprocessor prevents a functional error operation of the microprocessor. In the instruction supplier, an instruction register temporarily stores an inputted instruction therein, and an instruction memory stores at least one instruction therein. At least one comparator is provided for detecting whether or not at least one instruction stored in the instruction memory agrees with the instruction stored in the instruction register, respectively, by comparing them, and for outputting a comparison result signal for indicating the comparison result. Furthermore, an instruction generator generates at least one specific instruction in accordance with the comparison signal, and then, an instruction selector selects either one of the instruction stored in the instruction register and the specific instruction generated by the instruction generator to be executed, and outputs the selected instruction.

15 Claims, 18 Drawing Sheets

INSTRUCTION SUPPLIER FOR A MICROPROCESSOR CAPABLE OF PREVENTING A FUNCTIONAL ERROR OPERATION

This application is a continuation of application, Ser. No. 07/739,840, filed Aug. 2, 1991 now abandoned.

BACKGROUND OF THE INVENTION

1. Field of the Invention

The present invention relates to an instruction supplier, and more particularly, to an instruction supplier which is capable of preventing a functional error from taking place based upon an instruction sequence of a microprocessor.

2. Description of the Related Art

Since a microprocessor perform very logically complicated operations, there occurs various functional erroneous operations in the development stages thereof. Furthermore, it has become difficult to conduct a functional simulation including all instruction sequences within a predetermined practical time which may take place during its design stages. Therefore, in a design, a functional verification and a trial manufacture of each microprocessor, a confirmation of functional operations is performed by executing various test programs therein.

For this purpose, with respect to the erroneous functional operations taking place at an evaluation stage, the logic circuit and mask layout of the microprocessor is to be modified, which tends to extend the development time thereof. Particularly, with respect to a functional error operation taking place only in a complicated instruction sequence (for example, a case where a specific instruction is executed immediately after a floating decimal point calculation instruction), since the functional error can be found only in a program containing such an instruction sequence, it takes an extremely long time to confirm the functional operations of the processor.

In some cases, functional errors may be found after placing the microprocessor on the commercial market (for example, the i486 type microprocessor manufactured by the Intel Corporation, in the fall of 1989).

As described above, it is very difficult and it takes a long time to insure that a microprocessor can perfectly operate for all programs. Conventionally, when such a functional error operation takes place, a determination is made as to whether or not a modification of the software may cope therewith. If it is possible, the software is modified in many cases.

As described hereinabove, in the case where a functional error takes place, the general trend is to prevent the functional error by changing the compiler or the object code thereof. However, such a change in the software may involve a functional erroneous operation of the software. Furthermore, in the case where the software can not prevent the erroneous operation, there arises such a problem in that it take a longer time to develop and complete a microprocessor design because it is necessary to modify the logic circuit and the mask layout of the microprocessor.

SUMMARY OF THE INVENTION

Accordingly, an essential object of the present invention is to provide an instruction supplier for a microprocessor which is capable of preventing a functional error operation from taking place in a specific instruction sequence, thereby shortening a development time of the microprocessor.

In order to achieve the aforementioned objective, according to one aspect of the present invention, there is provided an instruction supplier for supplying instructions to a microprocessor comprising:

an instruction memory unit for storing instructions corresponding to instruction addresses;

an instruction register for temporarily storing therein an instruction read out from said instruction memory unit in accordance with an inputted instruction address;

an error instruction memory means for storing therein at least one error instruction therein for causing a functional error operation to occur in said microprocessor;

at least one comparison means for detecting whether or not at least one error instruction stored in said error instruction memory means agrees with the instruction stored in said instruction register, respectively, by comparing them, and outputting a comparison result signal for indicating the comparison result, said comparison result signal including an agreement signal representing the agreement of the instructions and a disagreement signal representing the disagreement of the instructions;

an instruction generation means for generating at least one specific instruction in accordance with the agreement signal outputted from said comparison means; and instruction selection means for selecting and outputting the instruction stored in said instruction register to said microprocessor in response to the disagreement signal, and for selecting and outputting the specific instruction generated by said instruction generation means to said microprocessor in response to the agreement signal, thereby preventing any functional error operation from taking place in said microprocessor.

According to another aspect of the present invention, there is provided an instruction supplier for supplying instructions to a microprocessor comprising:

an instruction memory unit for storing instructions corresponding to instruction addresses;

an instruction register for temporarily storing therein an instruction read out from said instruction memory unit in accordance with an inputted instruction address for each cycle;

an error instruction memory means for storing therein at least two error instructions including first and second error instructions, each error instruction causing a functional error operation to occur in said microprocessor;

a first comparison means for detecting whether or not the first error instruction stored in said error instruction memory means agrees with the instruction stored for a first cycle in said instruction register by comparing them, and for outputting a first comparison result signal for indicating the comparison result, said first comparison signal including a first agreement signal representing the agreement of the instructions and a first disagreement signal representing the disagreement of the instructions;

a second comparison means for detecting whether or not the second error instruction stored in said error instruction memory means agrees with the instruction stored for a second cycle in said instruction register, respectively, by comparing them, and for outputting a second comparison result signal for indicating the comparison result, said second comparison signal including a second agreement signal representing the agreement of the instructions and a second disagreement signal representing the disagreement of the instructions;

an instruction generation means for generating a specific instruction in accordance with the first agreement signal outputted from said first comparison means and the second agreement signal outputted from said second comparison means; and an instruction selection means for selecting and outputting the instruction stored in said instruction register for the first cycle, and for selecting and outputting the instruction stored in said instruction register for the second cycle, and for selecting and outputting the specific instruction generated by said instruction generation means for a third cycle, thereby preventing any functional error operation from occurring in said microprocessor.

According to a further aspect of the present invention, there is provided an instruction supplier for supplying instructions to a microprocessor comprising:

an instruction memory unit for storing instructions corresponding to instruction addresses;

an instruction register for temporarily storing therein a natural number N of instructions read out from said instruction memory unit in accordance with an inputted address;

an error instruction memory means for storing therein at least N error instructions, each error instruction causing a functional error operation to occur in said microprocessor;

at least N comparison means for detecting whether or not the N predetermined error instructions among the error instructions stored in said error instruction memory means agree with the N instructions stored in said instruction register, respectively, by comparing them, and for outputting a comparison result signal for indicating the comparison result, said comparison result signal including an agreement signal representing the agreement of the instructions and a disagreement signal representing the disagreement of the instructions;

an instruction generation means for generating at least one specific instruction in accordance with the agreement signal outputted from said comparison means;

an instruction replacement means for replacing at least one predetermined instruction among the N instructions stored in said instruction register, with at least one specific instruction generated by said instruction generation means in accordance with the agreement signal, and for outputting the replaced instructions; and an instruction selection means for selecting and outputting the N instructions stored in said instruction register to said microprocessor in response to the disagreement signal, and for selecting and outputting the instructions outputted from said instruction replacement means to be executed to said microprocessor in response to the agreement signal, thereby preventing any functional error operation from occurring in said microprocessor.

According to a still further aspect of the present invention, there is provided an instruction supplier for supplying instructions to a microprocessor comprising:

an instruction memory unit for storing instructions corresponding to instruction addresses;

an instruction register for temporarily storing therein a natural number N of instructions read out from said instructions memory unit in accordance with an inputted instruction address;

an instruction memory means for storing therein at least N error instructions, each error instructions causing a functional error operation to occur in said microprocessor;

at least N comparison means for detecting whether or not the N predetermined error instructions among the error instructions stored in said instruction memory means agree with the N instructions stored in said instruction register, respectively, by comparing them, and for outputting a comparison result signal for indicating the comparison result, said comparison result signal including an agreement signal representing the agreement of the instructions and a disagreement signal representing the disagreement of the instructions;

an instruction generation means for generating at least one specific instruction in accordance with the agreement signal outputted from said comparison means; and N instruction selection means, each instruction selection means selecting and outputting one of the N instructions stored in said instruction register to said microprocessor in response to the disagreement signal, and for selecting and outputting the specific instruction outputted from said instruction generation means to be executed to said microprocessor in response to the agreement signal, thereby preventing any functional error operation from occurring in said microprocessor.

According to a still more further aspect of the present invention, there is provided an instruction supplier for supplying instructions to a microprocessor comprising:

an instruction memory unit for storing instructions corresponding to instruction addresses;

an instruction register for temporarily storing therein a natural number N of instructions read out from said instruction memory unit in accordance with an inputted instruction address for each cycle;

an error instruction memory means for storing therein at least 2N error instructions including first N error instructions and second N error instructions, each error instruction causing a functional error operation to occur in said microprocessor;

a first comparison means for detecting whether or not the first N error instructions stored in said error instruction memory means agree with the N instructions stored for a first cycle in said instruction register by comparing them, and for outputting a first comparison result signal for indicating the comparison result, said first comparison signal including a first agreement signal representing the agreement of the instructions and a first disagreement signal representing the disagreement of the instructions;

a second comparison means for detecting whether or not the second N error instructions stored in said error instruction memory means agrees with the N instruction stored for a second cycle in said instruction register, respectively, by comparing them, and for outputting a second comparison result signal for indicating the comparison result, said second comparison signal including a second agreement signal representing the agreement of the instructions and a second disagreement signal representing the disagreement of the instructions;

an instruction generation means for generating specific N instructions in accordance with the first agreement signal outputted from said first comparison means and the second agreement signal outputted from said second comparison means; and N instruction selection means for respectively selecting and outputting the N instructions stored in said instruction register for the first cycle, and for selecting and outputting the N instructions stored in said instruction register for the second cycle, and for selecting and outputting the specific N instructions generated by said instruction generation means for a third cycle, thereby preventing any functional error operation from taking place in said microprocessor.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

First Preferred Embodiment

Figure 1:
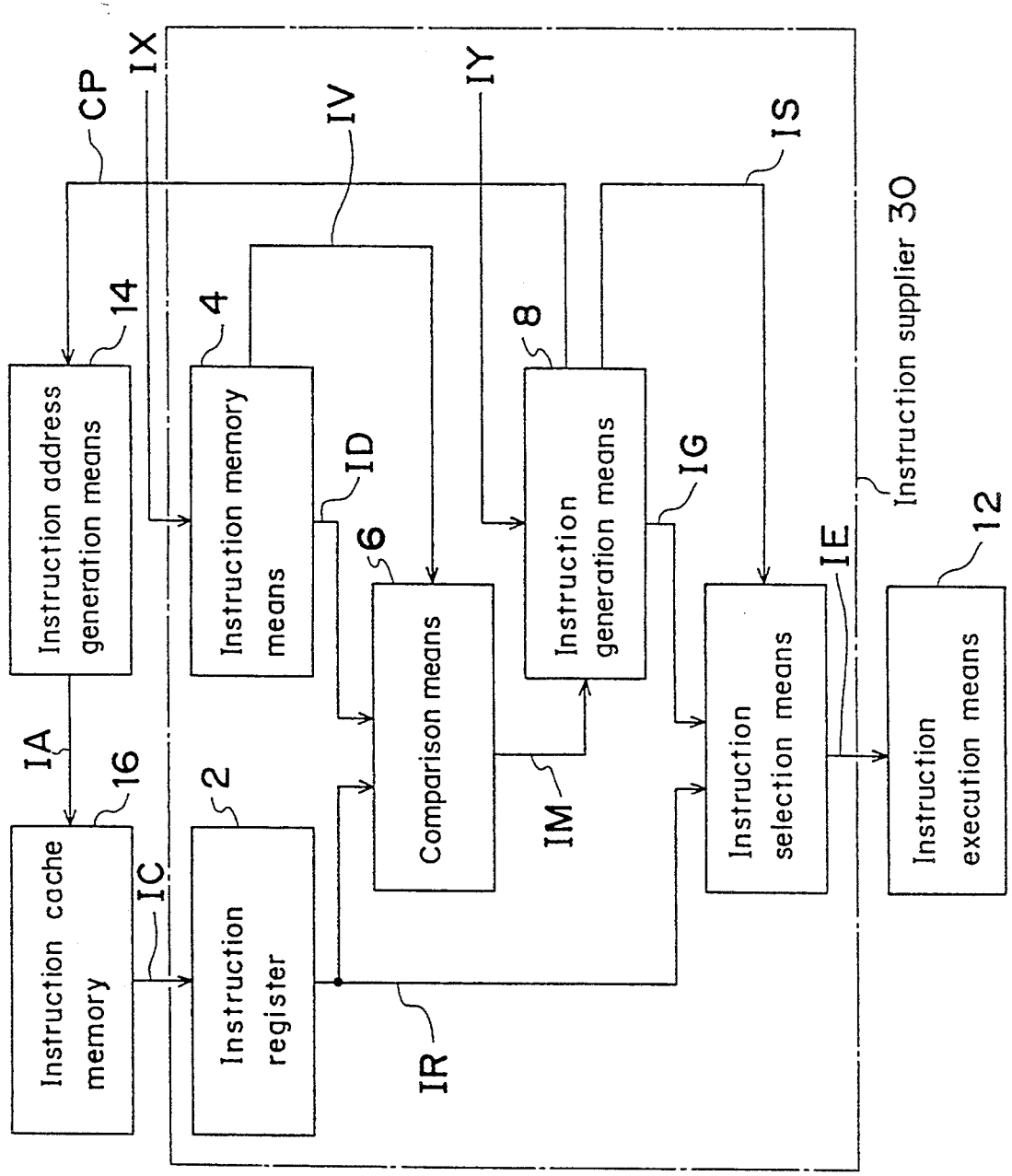
FIG. 1 is a block diagram of an instruction supplier according to a first preferred embodiment of the present invention.

FIG. 1 is a block diagram showing an instruction supplier 30 according to a first preferred embodiment of the present invention. Referring to FIG. 1, the instruction supplier comprises an instruction register 2, an instruction memory means 4, a comparison means 6 for detecting whether or not the content of the instruction register 2 and that of the instruction memory means 4 are in agreement with each other, an instruction generation means 8, and an instruction selection means 10. There is further provided an instruction execution means 12 for analyzing and executing instructions, an instruction address generation means 14 for generating an instruction address, and an instruction cache memory 16 for storing instructions.

In order to simplify the explanation, in the present embodiment, a word length of one instruction is set to be of a fixed length, for example, of 32 bits.

In the first place, the description will be made of a usual sequence. In an instruction fetch operation, an instruction address IA, generated by the instruction address generation means 14, is transferred to the instruction cache memory 16 in order to access it, and then, an instruction IC read out from the instruction cache memory 16 is stored in the instruction register 2. Since the instruction memory means 4 is in an initial state when no functional error takes place, the instruction memory means 4 outputs a comparison enabling bit IV having an "L" level (in a disabled state) to the comparison means 6 so that data read out from the instruction memory 4 is not compared with the content IR of the instruction register 2, and agreement detection is not effected by the comparison means 6. In this case, the instruction generation means 8 outputs a control signal IS having an "L" level so that the content IR of the instruction register is always selected by the instruction selection means 10 without generating an instruction IG. Then, the instruction selection means 10 outputs the content IR of the instruction register 2 to the instruction execution means 12 as an instruction IE to be executed for the next cycle (at an instruction analyzing stage). The instruction outputted from the instruction selection means 10 is executed by the instruction execution means 12.

The instruction execution means 12 executes, for example, a load instruction, a store instruction, an arithmetic logical calculation instruction, a shift instruction, a floating point arithmetic instruction, a conditional branching instruction, a non-conditional branching instruction, etc.

Next, such a case where a functional erroneous operation has been found in an evaluation stage of a microprocessor will be described below.

For example, in the case that it is found from the evaluation result that a functional error will take place unless a specific instruction (for example, an instruction I0) is executed immediately after execution of an instruction I1, the instruction I1 is first written into the instruction memory means 4 in accordance with an instruction IX, and at the same time, an enabled state is set in the comparison means 6 by setting the comparison enabling bit IV to an "H" level. In this case, since there are cases where it is not necessary to compare all of the 32 bits of the instruction I1 with the instruction IR (for example, in a case of a register number which may be specified by the instruction), an instruction to be detected can be specified by setting a value in a mask registor (not shown in FIG. 1) provided for specifying bits to be compared therewith. Furthermore, writing a value in the mask register can be also executed in accordance with an instruction. Furthermore, the instruction I0 may be generated by the instruction generation means 8 in accordance with an instruction IY.

By this arrangement, the comparison means 6 checks whether or not the content IR of the instruction register 2 agree with the content ID (for example, the instruction I1) of the instruction memory means 4 for each cycle. When the comparison means 6 detects an agreement, an agreement detection signal IM having an "H" level is transmitted to the instruction generation means 8. The instruction generation means 8 transfers a selection signal IS having an "H" level to the instruction selection means 1 so as to insert the instruction IG (for instance, the instruction I0) generated by the instruction generation means 8 for the next cycle after execution of the instruction I1 is transferred to the instruction execution means 12, and generates and outputs to the instruction address generation means 14 a control signal CP having an "H" level for enabling the instruction address generation means 14 and the instruction register 2 to stop the instruction fetch operations for the next cycle. In accordance with the control signal CP having an "H" level, the instruction address generation means 14 holds the current address therein without generating an address for the next cycle. By resetting the agreement detection signal IM to an "L" level in accordance with signals such as the control signal CP having an "H" level, the program flow returns to the usual instruction sequence.

When the instruction I0 is supplied to the instruction execution means 12, the instruction fetch operation is resumed by setting the selection signal IS to an "L" level and setting the control signal CP to an "L" level, and then, the instruction address generation means 14 generates an address IA so as to access the instruction cache 16 memory. Thereafter, until an instruction sequence for generating a functional error operation is detected, the instructions are executed by the usual instruction sequence.

Figure 11:
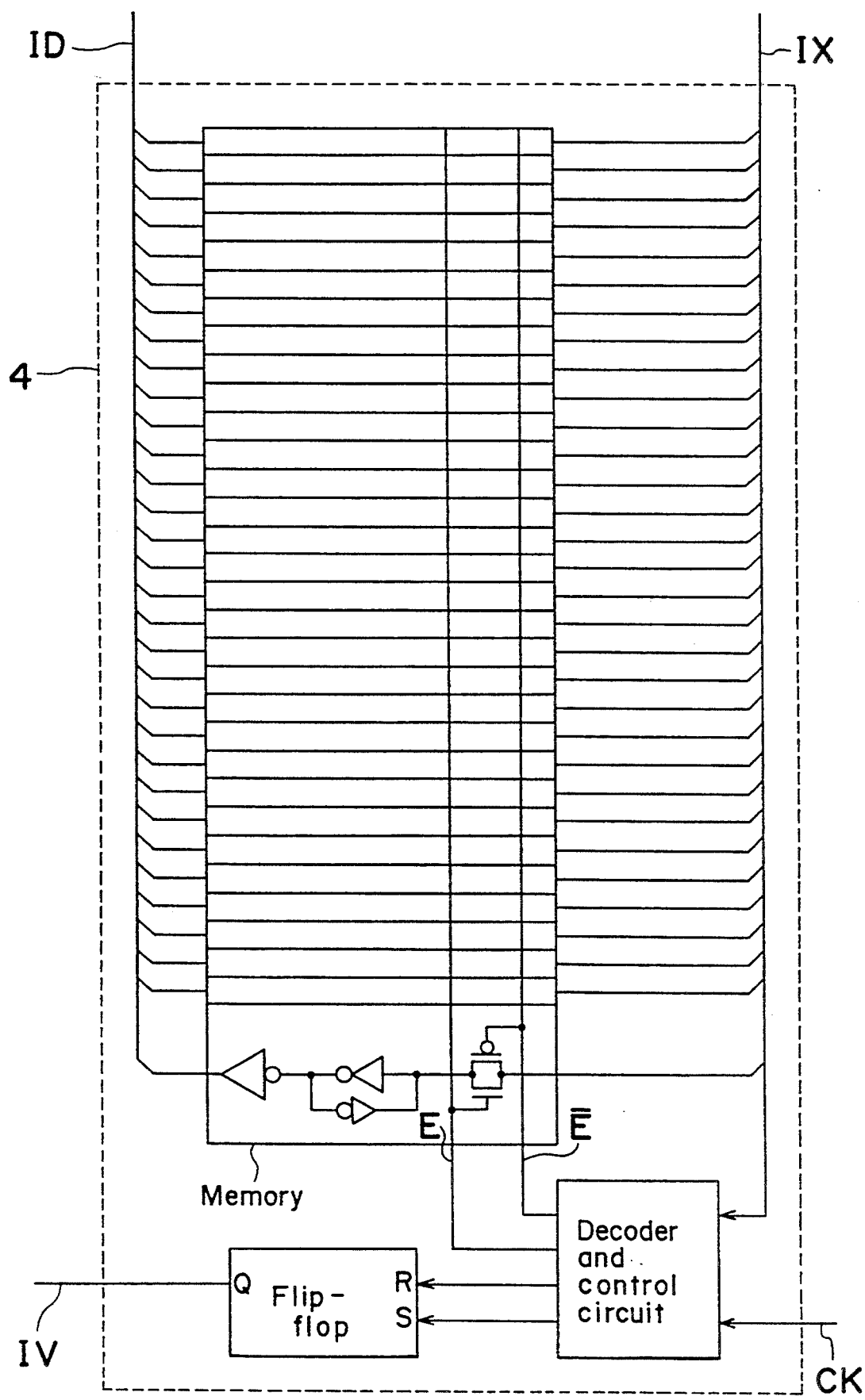
FIG. 11 is a circuit diagram showing concrete circuitry of the instruction memory means of the first preferred embodiment.

An example of a concrete circuitry of the instruction memory means 4 of FIG. 1 is shown in FIG. 11. Referring to FIG. 11, the instruction memory means 4 comprises a decoder and control circuit for decoding an instruction IX and generating control signals and the like, a memory circuit (constituted by transfer gates and latch circuits) for storing an instruction, and an RS type flip-flop for showing the state of the comparison enabling bit IV. The decoder and control circuit generates an enabling signal for writing an instruction into the memory circuit, a set signal for setting the comparison enabling bit IV outputted from the flip-flop, and a reset signal for resetting the comparison enabling bit IV. The operation can be effected in synchronization with a clock CK for an operation cycle.

Figure 12:
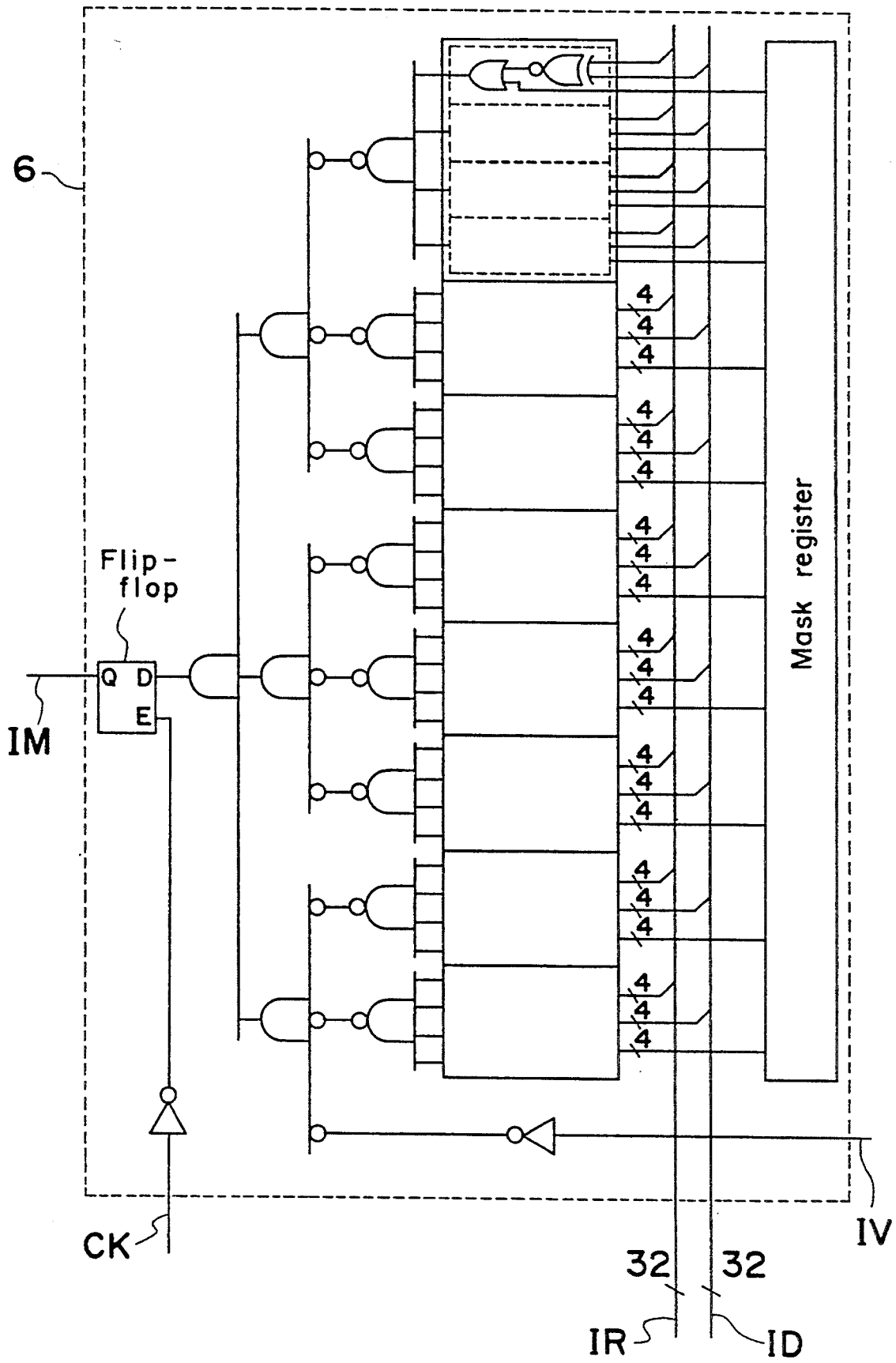
FIG. 12 is a circuit diagram showing concrete circuitry of the comparison means of the first preferred embodiment.

Furthermore, an example of concrete circuitry of the comparison means 6 of FIG. 1 is shown in FIG. 12.

Referring to FIG. 12, the comparison means 6 comprises a comparator of 32 bits for comparing the content IR of the instruction register with the content ID of the instruction memory means in accordance with the state of the comparison enabling bit IV, a mask register for specifying a bit to be compared for each bit, and a latch for storing an agreement detection result of the comparator. When the comparison enabling bit IV is in a set state, an instruction of 32 bits is checked for each bit whether or not all of the bits are in agreement. Furthermore, a bit which is not compared by the mask register is specified by the mask register so as to be set. As a result, it is not necessary to perform the comparison operation of the bit.

Figure 13:
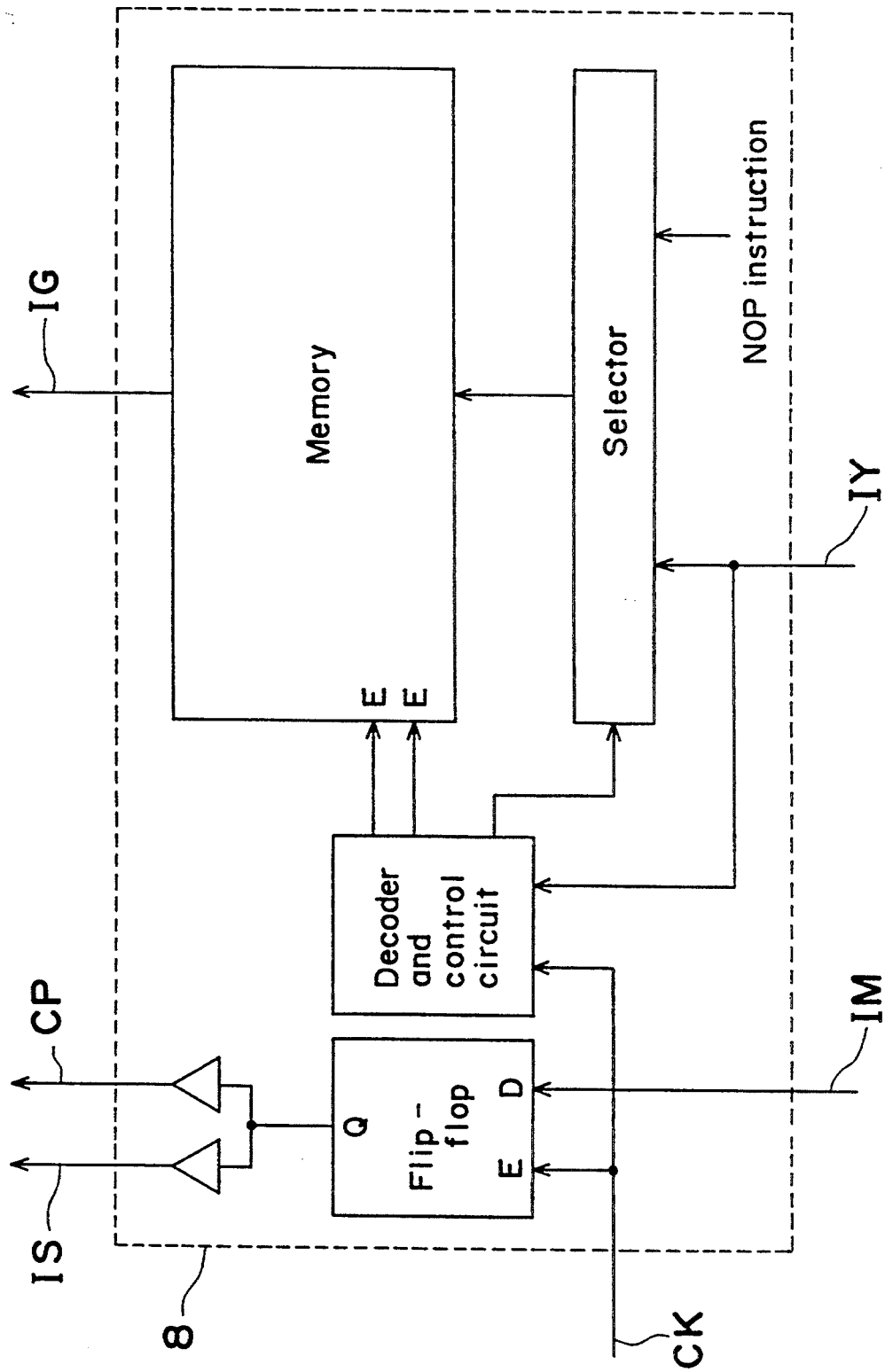
FIG. 13 is a circuit diagram showing concrete circuitry of the instruction generation means of the first preferred embodiment.

Furthermore, an example of concrete circuitry of the instruction generation means 8 of FIG. 1 is shown in FIG. 13. Referring to FIG. 13, the instruction generation means 8 comprises a decoder and control circuit for generating control signals and the like by decoding the instruction IY, a selector for selecting an instruction to be stored in a memory, the memory for storing an instruction (constituted by a transfer gate and a latch), and a flip-flop for generating control signals IS and CP. In the decoder and control circuit, a control signal for the selector for selecting an instruction to be stored and an enabling signal for writing an instruction into the memory are generated. Furthermore, the agreement detection signal IM is inputted to the flip-flop, and then, in accordance thereto, the flip-flop generates a control signal CP and a selection signal IS in synchronization with the clock CK.

Figure 14:
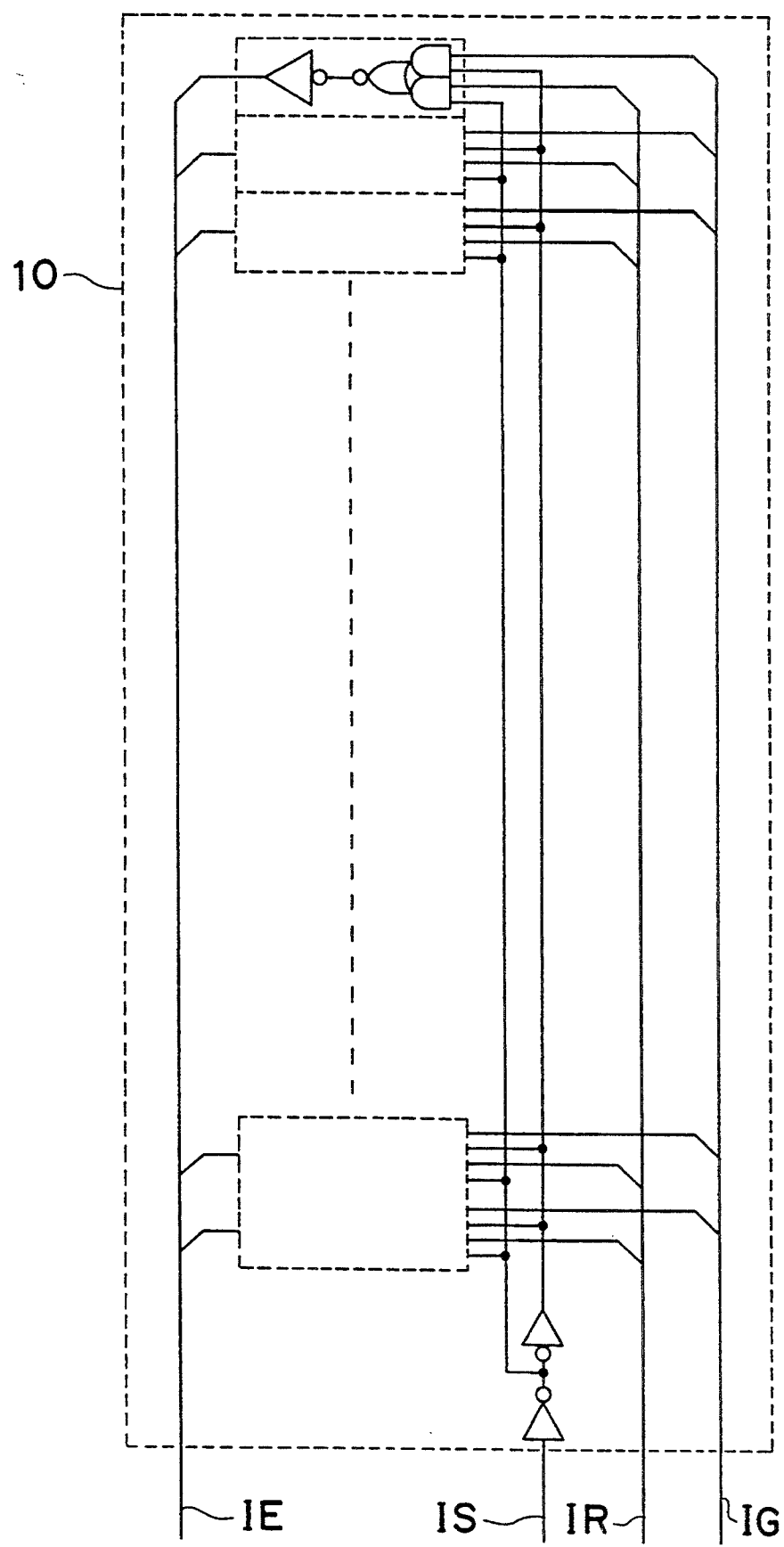
FIG. 14 is a circuit diagram showing concrete circuity of the instruction selection means of the first preferred embodiment.

Furthermore, an example of concrete circuitry of the instruction selection means 10 of FIG. 1 is shown in FIG. 14. Referring to FIG. 14, the instruction selection means 10 comprises a selector of 32 bits for selectively outputting either the content IR of the instruction register 2 or the output IG of the instruction generation means 8.

The concrete circuities of FIGS. 11 to 14 show examples of the preferred embodiment, and needless to say, the present preferred embodiment may be realized by other circuits having the equivalent functions.

Figure 6:
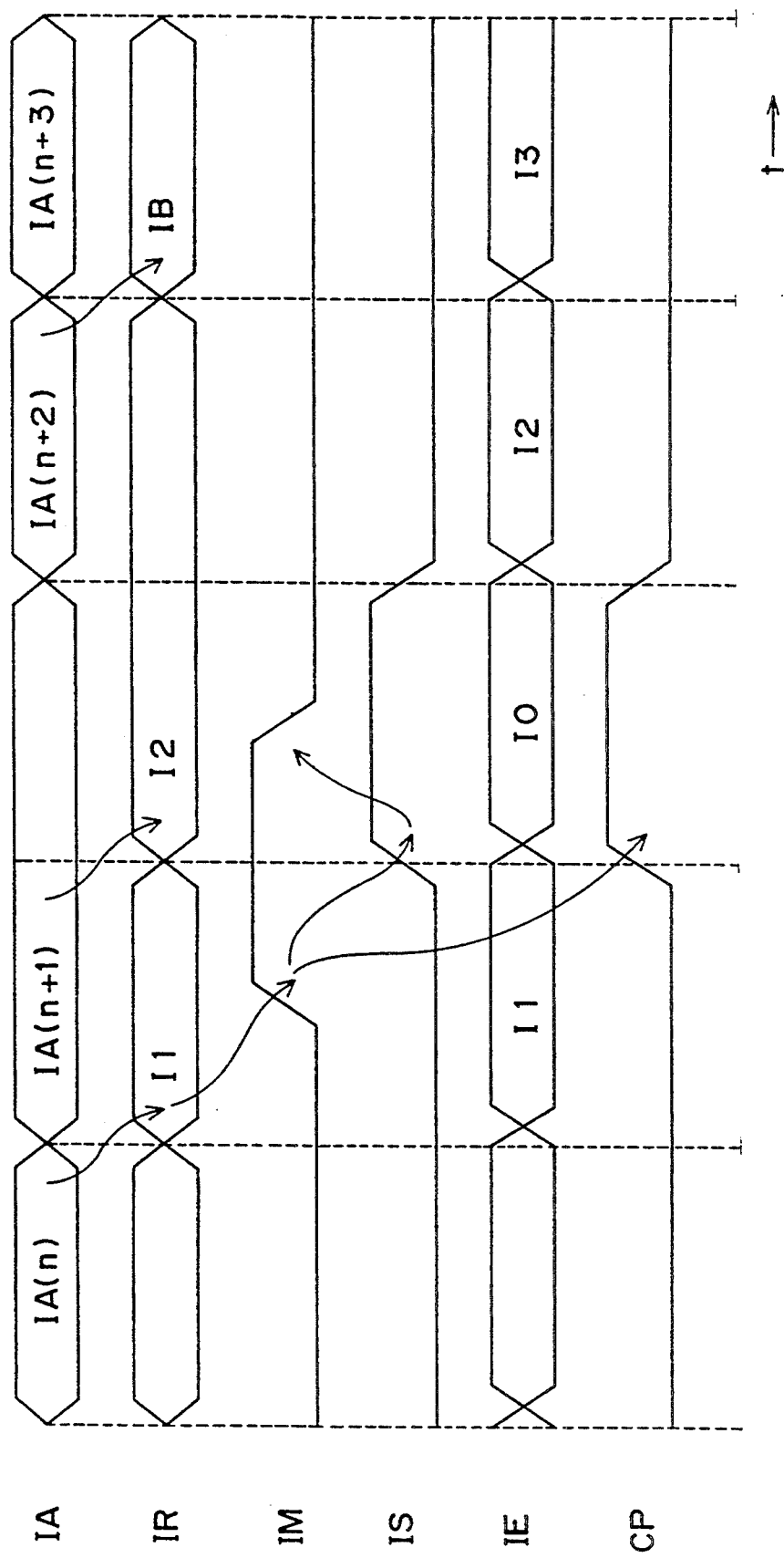
FIG. 6 is a timing chart showing waveforms of signals of the instruction supplier according to the first preferred embodiment.

FIG. 6 is a timing chart showing an operation of the instruction supplier 30 according to the first embodiment of the present invention. The instruction address generation means 14 generates an instruction address IA for each cycle for the instruction fetch so as to access the cache memory 16. The instruction register 2 stores instructions I1, I2 and I3, sequentially. Meanwhile, when the instruction I1 is stored by the instruction memory means 4, in order to surely execute an instruction I0 immediately after the instruction I1 is executed, if the instruction I1 is detected by the comparison means 6, the comparison means 6 generates the agreement detection signal IM having an "H" level and transfers it to the instruction generation means 8. In accordance thereto, the instruction generation means 8 generates and outputs the instruction I0 to the instruction selection means 8, and also transfers an control signal IS having the "H" level to the instruction selection means 10 so that the instruction I0 is inputted to the instruction executed means 12 for the cycle following to the instruction I1. By this arrangement, a microprocessor can be prevented from not operating normally due to a functional error operation arising from a specific instruction sequence (for example, a case where an instruction other than the instruction I0 is executed immediately after execution of the instruction I1).

At the same time, the instruction generation means 8 generates the control signal CP for controlling the instruction address generation means 14 and the instruction register 2 so that the instruction I2 is held by the register 2 for the next cycle, and also the generation of the instruction address IA is stopped, thereby interrupting the access to the instruction cache memory 16.

Although a description has been provided for the case where the instruction memory means 4 stores only one instruction in FIG. 1 of the present preferred embodiment, the instruction supplier may comprise an instruction memory means for storing a plurality of instructions, a plurality of comparison means corresponding to said respective instruction memory means, and instruction generation means for generating a plurality of instructions corresponding to the outputs of respective said comparison means. As is clear from the above description, the instruction supplier of the preferred embodiment can cope with the case where a functional error operation takes place unless a specific instruction is executed immediately after execution of an instruction.

Second Preferred Embodiment

Figure 2:
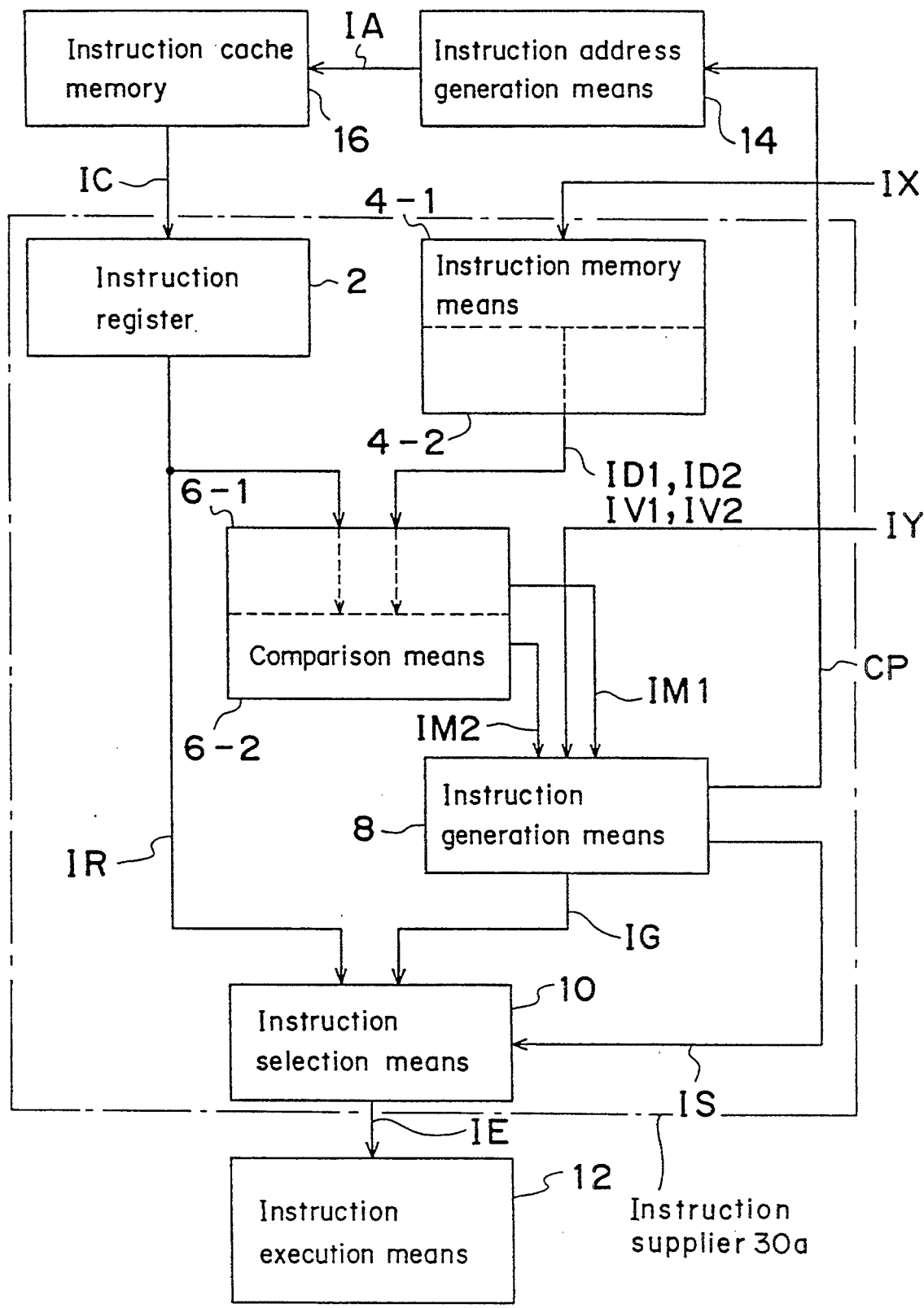
FIG. 2 is a block diagram of an instruction supplier according to a second preferred embodiment of the present invention.

FIG. 2 is a block diagram showing an instruction supplier 30a according to a second preferred embodiment of the present invention. The second preferred embodiment is characterized in that two instructions are stored by the instruction memory means 4-1 and 4-2. Although a functional error operation is assumed to take place when an instruction other than a specific instruction is executed after execution of an instruction in the first preferred embodiment, the first preferred embodiment does not always cope with all of the cases of functional error operations taking place in an instruction sequence.

When a functional error operation is assumed to take place in the case where two specific instructions are continuously executed, the first preferred embodiment shown in FIG. 1 can not cope with such a case.

In FIG. 2, the same sections as those shown in FIG. 1 are denoted by the same numerals as those shown in FIG. 1. The instruction supplier 30a of the second preferred embodiment comprises a instruction register 2, a first instruction memory means 4-1, a second instruction memory means 4-2, a first comparison means 6-1, a second comparison means 6-2, an instruction generation means 8, and an instruction selection means 10. Further, there is provided an instruction execution means 12, an instruction address generation means 14, and an instruction cache 16.

Figure 7:
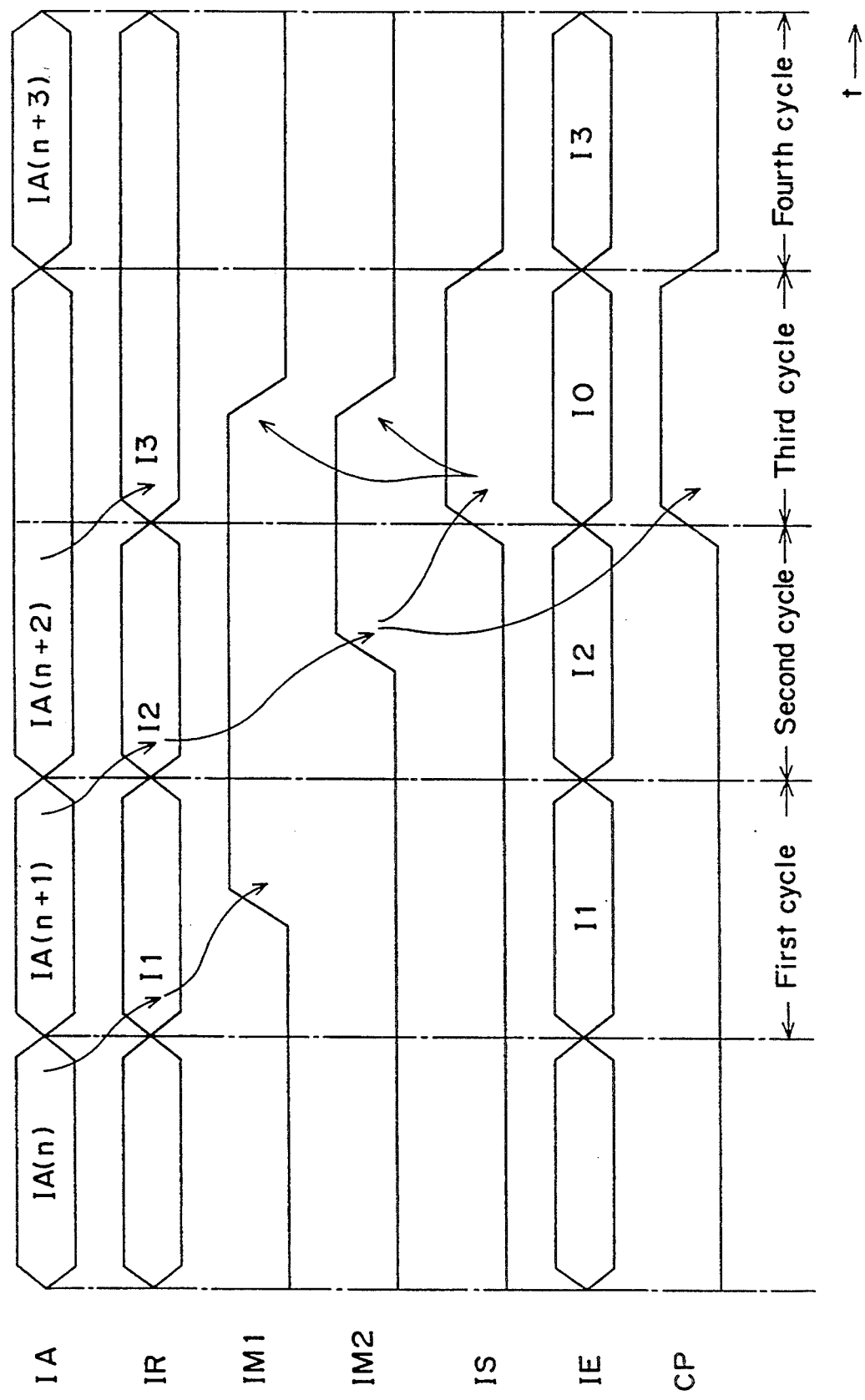
FIG. 7 is a timing chart showing waveforms of signals of the instruction supplier according to the second preferred embodiment.

FIG. 7 is a timing chart of the instruction supplier 30a of the second preferred embodiment in the case where a functional error operation takes place when specific two instructions are sequentially executed.

Referring to FIGS. 2 and 7, a case where a functional error operation takes place when an instruction I1 is executed for the first cycle, an instruction I2 is executed for the second cycle and an instruction i3 is executed for the third cycle will be described below.

First, in accordance with an instruction IX1, the instruction I1 is written into the first memory means 4-1, and at the same time, the comparison enabling bit IV1 is set to an "H" level. Next, in accordance with an instruction IX2, the instruction I2 is written into the second memory means 4-2 and the comparison enabling bit IV2 is set to an "H" level. Subsequently, in accordance with an instruction IY, the instruction generation means 8 generates an instruction I0. By this arrangement, the first comparison means 6-1 determines for each cycle whether or not the content IR of the instruction register 2 agrees with the content ID1 (for example, the instruction I1) of the first instruction memory means 4-1. When the agreement is detected by the first comparison means 6-1, the second comparison means 6-2 determines for each cycle whether or not the content IR of the instruction register 2 agrees with the content ID2 (for example, the instruction I2) of the second instruction memory means 4-2. If the agreement is also detected by the second comparison means 6-2, an instruction IG (for example the instruction I0) is generated for the next cycle by the instruction generation means 8 and is outputted to the instruction execution means 12. Then, the detection of the instruction sequence assumed above and the generation of the instruction for avoiding a functional error operation are effected.

As a basic concept, the functional error operation can be prevented by outputting the instruction I0 generated by the instruction generation means 8 for the third cycle to the instruction execution means 12 to execute it therein. In this case, the instruction I1 is detected for the first cycle by the first comparison means 6-1, and then, the first agreement detection signal IM1 is set to an "H" level. Thereafter, the instruction I2 is detected for the second cycle by the second comparison means 6-2, and then, the second agreement detection signal IM2 is set to an "H" level. At that time, if the second agreement detection signal IM2 is not set, the first agreement detection signal IM1 returns to the reset state.

When both the agreement detection signals IM1 and IM2 become an "H" level, the instruction selection signal IS is set to an "H" level for the third cycle, and the instruction selection means 10 selects the instruction I0 generated by the instruction generation means 8 for the third cycle, and outputs the selected instruction I0 to the instruction execution means 12. At the same time, the instruction generation means 8 sets the control signal CP to an "H" level so as to stop the operation of the instruction address generation means 14. By resetting the first agreement detection signal IM1 and the second agreement detection signal IM2 in accordance with signals such as the control signal CP having an "H" level, the program flow returns to the usual sequence.

It is needless to say that the first instruction memory means 4-1 and the second instruction memory means 4-2 shown in FIG. 2 can be realized respectively by the composition shown in FIG. 11.

Figure 15:
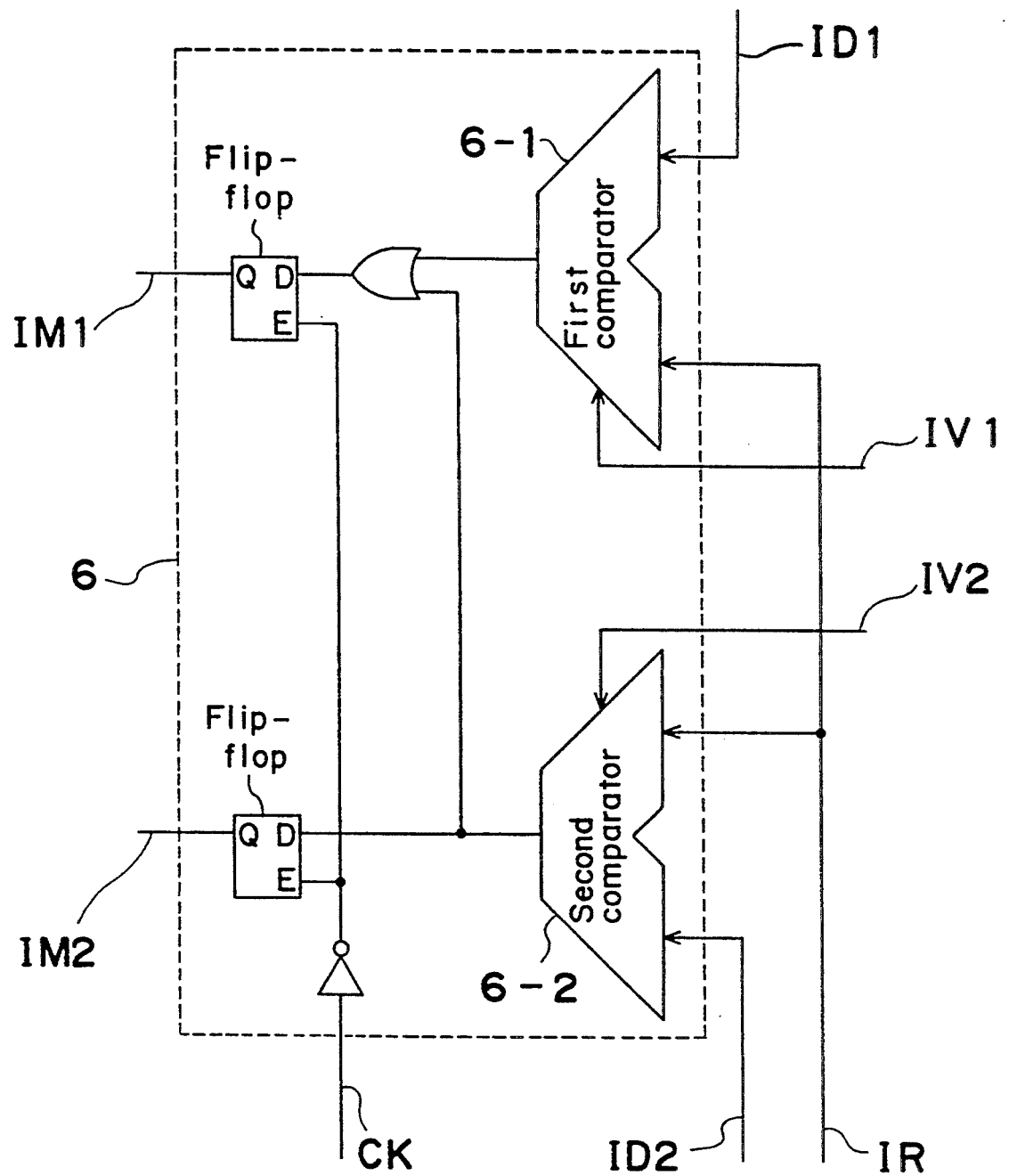
FIG. 15 is a circuit diagram showing concrete circuitry of the comparison means of the second preferred embodiment.

FIG. 15 shows an example of a concrete circuitry of the comparison means 6 of FIG. 2. Referring to FIG. 15, the comparison means 6 comprises a first comparator, a second comparator, and a logic circuit for generating the agreement detection signals IM1 and IM2 in accordance with the outputs of respective comparators. Each of the first and second comparators can be constituted in a manner similar to that shown in FIG. 12.

Needless to say, the instruction generation means 8 of FIG. 2 can be realized by the composition shown in FIG. 13.

Needless to say, the instruction selection means 10 of FIG. 2 can be realized by the composition shown in FIG. 14.

Furthermore, in order to detect a functional error operation caused by an instruction sequence, it is not necessary to detect a sequence exceeding a stage number of an internal pipeline of the microprocessor. For example, if the internal pipeline of the microprocessor has four stages (for example, including a instruction fetch, a load, an execution, and a store), it is not necessary to detect a sequence including five instructions.

As is clear from the above description, the second preferred embodiment can prevent a functional error operation arising from a sequence including a plurality of instructions.

Third Preferred Embodiment

Figure 3:
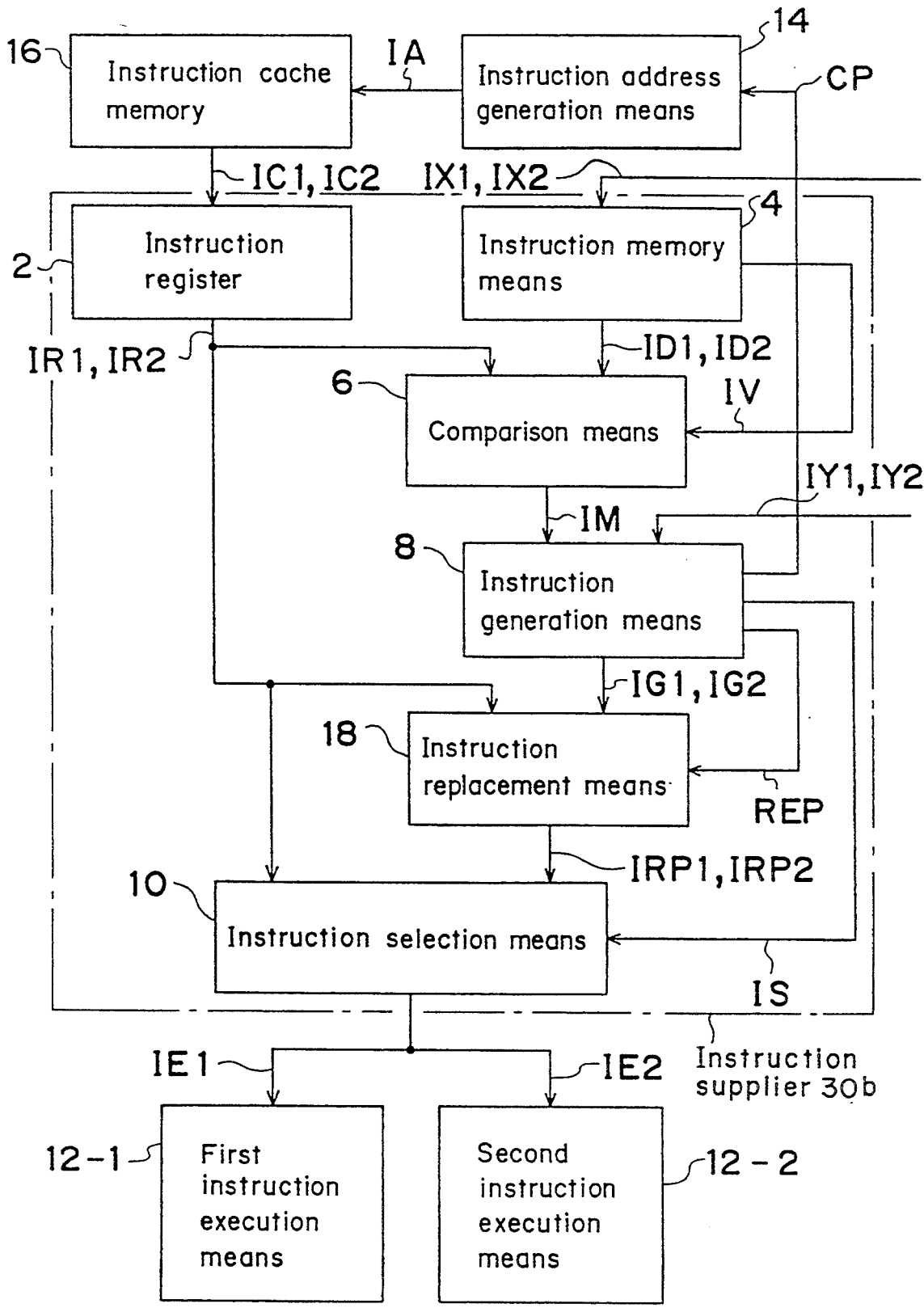
FIG. 3 is a block diagram of an instruction supplier according to a third preferred embodiment of the present invention.

FIG. 3 is a block diagram showing an instruction supplier 30*b* according to a third preferred embodiment of the present invention. The third preferred embodiment is characterized in that two or more instructions are stored in the register 2. Namely, it is applied to a super-scaler type microprocessor having a plurality of instruction execution means in order to simultaneously execute a plurality of instructions. In this case, there is assumed a case where a functional error operation takes place when a combination of specific instructions is simultaneously executed. The description will be made of a case where the instruction register 2 stores two instructions, namely, a case where two instruction execution means are provided, in order to simplify the description.

In the first place, a usual sequence will be explained below. In an instruction fetch stage, an instruction address IA generated by an instruction address generation means 14 is transferred to an instruction cache memory 16 so as to provide access thereto, and then, two instructions IC1 and IC2 read out from the instruction cache memory 16 are stored in an instruction register 2. Since an instruction memory means 4 is in an initial state when no functional error operation occurs, the instruction memory means outputs the comparison enabling bit IV having an "L" level (in a disabled state) to a comparison means 6 so that the comparison means 6 does not compare an instruction read out from the instruction memory means 4 with each of the contents IR1 and IR2 of the instruction register 2. In this case, since an instruction generation means 8 does not generate an instruction IG1 or instructions IG1 and IG2, an instruction replacement means 18 always outputs the contents IR1 and IR2 of the instruction register 2. By this arrangement, the instruction generation means 8 outputs the control signal IS having an "L" level so that the contents IR1 and IR2 of the instruction register 2 are selected by an instruction selection means 10. Thereafter, the instruction selection means 10 outputs the contents IR1 and IR2 of the instruction register 2 respectively to a first instruction execution means 12-1 and a second instruction execution means 12-2 as instructions IE1 and IE2 to be executed for the next cycle (at an instruction analyzing stage). The first and second instruction execution means 12-1 and 12-2 execute, for example, a load instruction, a store instruction, an arithmetic logic calculation instruction, a shift instruction, a floating point calculation instruction, a conditional branching instruction, and an unconditional branching instruction, etc.

Next, in the case where a functional error operation is found at an evaluation stage of a microprocessor, for example, in the case where it is found that a functional error operation takes place unless specific instructions (for example, instructions I01 and I02) are executed immediately after execution of instructions I11 and I12, first of all, the instructions I11 and I12 are written into the instruction memory means 4 in accordance with instructions IX1 and IX2, and also the comparison enabling bit IV is set to an "H" level to enable the comparison means 5 to operate. In this case, since there are cases where it is not necessary to compare all of 64 bits of the instructions I11 and I12 with the instructions IR1 and IR2 (such as a register number which can be specified by an instruction, and so on), the instruction to be detected can be specified by providing a mask register (not shown) for specifying a bit to be compared and setting a value in the mask register. It is also possible to write a value in the mask register in accordance with an instruction. Furthermore, in accordance with instructions IY1 and IY2, the instruction generation means 8 is enabled to generate the instructions I01 and I02.

By this arrangement, the comparison means 6 determines for each cycle whether or not the contents IR1 and IR2 of the instruction register 2 agree with the content ID1 and ID2 (for example, the instructions I11, I12) of the instruction memory means 4. When the comparison means 6 detects an agreement, it sets the agreement detection signal IM to an "H" level and transfers it the instruction generation means 8. In the instruction generation means 8, the instructions I01 and I02 are generated and transferred to the instruction replacement means 18. On the other hand, replacement information REP with respect to replacement of the instruction is supplied to the instruction replacement means 18 from the instruction generation means 8. Then, in accordance with the replacement information REP, the replacement between the contents IR1 and IR2 of the instruction register 2 and the contents IR1 and IR2 of the instruction generation means 8 is effected, and the instruction replacement means 18 generates signals IRP1 and IRP2 and transfers them to the instruction selection means 10. The instruction generation means 8 transfers the selection signal IS having an "H" level to the instruction selection means 10 so that instructions IG1 and IG2 (such as the instructions I01 and I02) outputted from the instruction replacement means 18 are inserted for the next cycle following a cycle where the instructions I11 and I12 are transferred respectively to the first and second instruction execution means 12-1 and 12-2, and also, the instruction generation means 8 generates and transfers the control signal CP having an "H" level to the instruction address generation means 14 in order to stop an instruction fetch operation of the instruction address generation means 14 and the instruction register 2 for the next cycle. Thus, the agreement detection signal IM is reset in accordance with the control signal CP having an "H" level and the like, the program flow returns to the usual instruction sequence.

When the instructions I01 and I02 are respectively supplied to instruction execution means 12-1 and 12-2, the instruction fetch operation is resumed by setting the selection signal IS to an "L" level and the setting control signal CP to an "L" level, and then, the instruction address generation means 14 generates an address IA to access the instruction cache memory 16.

In the above explanation, a functional error operation can be prevented by inserting the instructions I01 and I02 for the next cycle of the instructions I11 and I12. However, a functional error operation may take place in some cases by the executing the instructions I11 and I12 simultaneously for the same cycle. In this case, it is necessary to perform a replacement of instructions so that the instructions I11 and I12 are not executed simultaneously. For example, the instructions I11 and I02 (or the instructions I01 and I12) are first transferred to the first and second instruction execution means 12-1 and 12-2, and then, for the next cycle, the instructions I01 and I12 (or instructions I11 and I02) are supplied to the first and second instruction execution means 12-1 and 12-2, thereby preventing the functional error operation. In this case, the instructions I01 and I02 NOP instruction may be supplied thereto.

Needless to say, the instruction memory means 6 of FIG. 3 can be realized by the arrangement shown in FIG. 11.

Needless to say, the comparison means 4 of FIG. 3 can be realized by the arrangement shown in FIG. 12.

Needless to say, the instruction generation means 8 of FIG. 3 can be realized by the arrangement shown in FIG. 13.

Needless to say, the instruction selection means 10 of FIG. 3 can be realized by the arrangement shown in FIG. 14.

Figure 16:
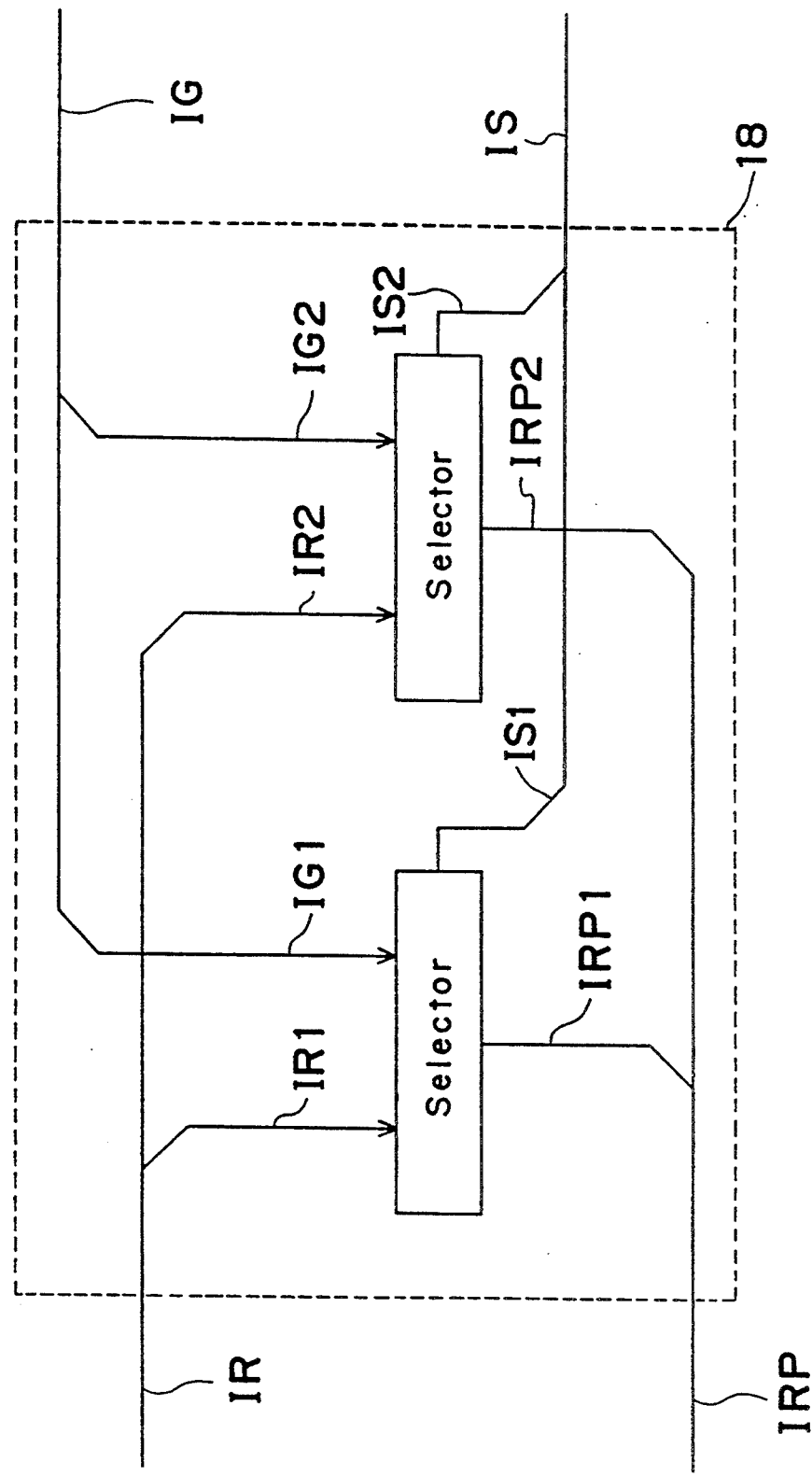
FIG. 16 is a circuit diagram showing concrete circuity of the instruction replacement means of the third preferred embodiment.

An example of concrete circuitry of the instruction replacement means 18 is shown in FIG. 16. Referring to FIG. 16, the instruction replacement means 18 comprises a selector for selecting either the content IR1 of the instruction register 2 or the instruction IG1 generated by the instruction generation means 8, and another selector for selecting either the content IR2 of the instruction register 2 or the instruction IG2 generated by the instruction generation means 8.

Figure 8:
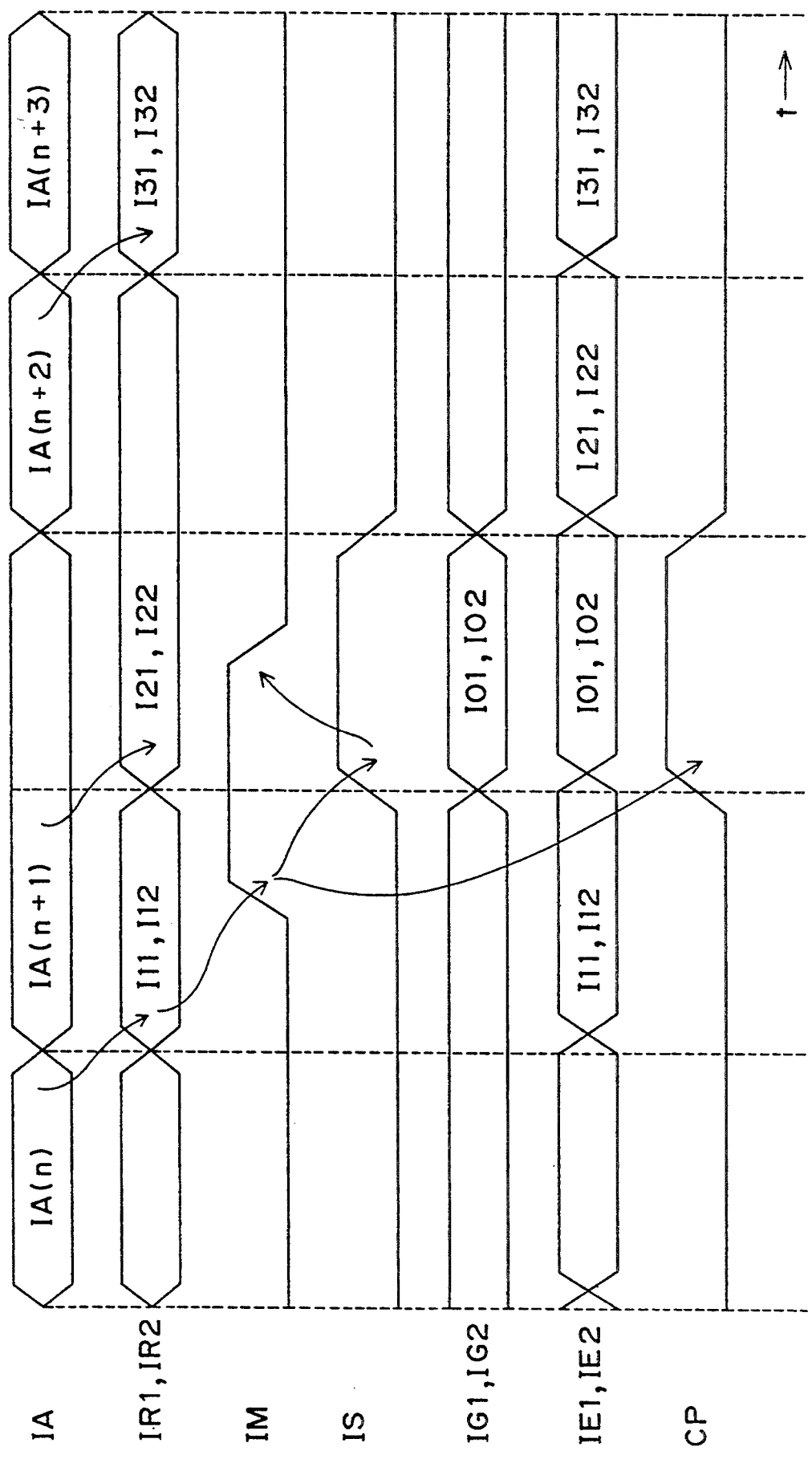
FIG. 8 is a timing chart showing waveforms of signals of the instruction supplier according to the third preferred embodiment.

FIG. 8 is a timing chart showing an operation of the instruction supplier 30b according to the third preferred embodiment. For the instruction fetch, the instruction address generation means 14 generates for each cycle an instruction address IA to access the instruction cache memory 16. The instruction register 2 sequentially stored the instruction I11 and I12 at an instruction address IA(n), and stored the instructions I21 and I22 at an instruction address IA(n+1) stored the instructions I31 and I32 at an instruction address IA(n+2). On the other hand, the instructions I11, and I12 are stored by the instruction memory means 4. Then, when they are detected by the comparison memory 6, the comparison means 6 generates and transfers the agreement detection signal IM having an "H" level to the instruction generation means 8 in order to always execute the instructions I01 and I02 immediately after execution of the instructions I11 and I12. The instruction generation means 8 generates the instructions I01 and I02, and transfers the control signal IS having an "H" level to the instruction selection means 10 so that, for the next cycle of instructions I11 and I12, the instructions I01 and I02 are respectively outputted to the first and second instruction execution means 12-1 and 12-2. By this operation, it is possible to prevent a microprocessor from ceasing to operate normally due to a functional error operation arising from a specific instruction sequence, for instance, in a case where instructions other than the instructions I01 and I02 are executed immediately after execution of instructions I11 and I12.

Simultaneously with the above operation, the instruction generation means 8 generates the control signal CP for controlling the instruction address generation means 14 and the instruction register 2 so as to enable the instruction register 2 to hold the instructions I21 and I22 therein even for the next cycle, and also to interrupt the access to the instruction cache memory 16 by suspending generation of the instruction address IA.

Although description is made of, in FIG. 3, a case where the instruction register 2 and the instruction memory means 4 store only two instructions, needless to say, the instruction supplier may include a plurality of instruction memory means for storing two or more instructions, and a plurality of comparison means corresponding to respective instruction memory means and an instruction generation means for generating a plurality of instructions corresponding to the outputs of respective comparison means. As is clear from the above description, the instruction supplier can cope with a case where a functional error operation takes place unless a specific instruction is executed immediately after execution of a certain instruction.

Fourth Preferred Embodiment

Figure 4:
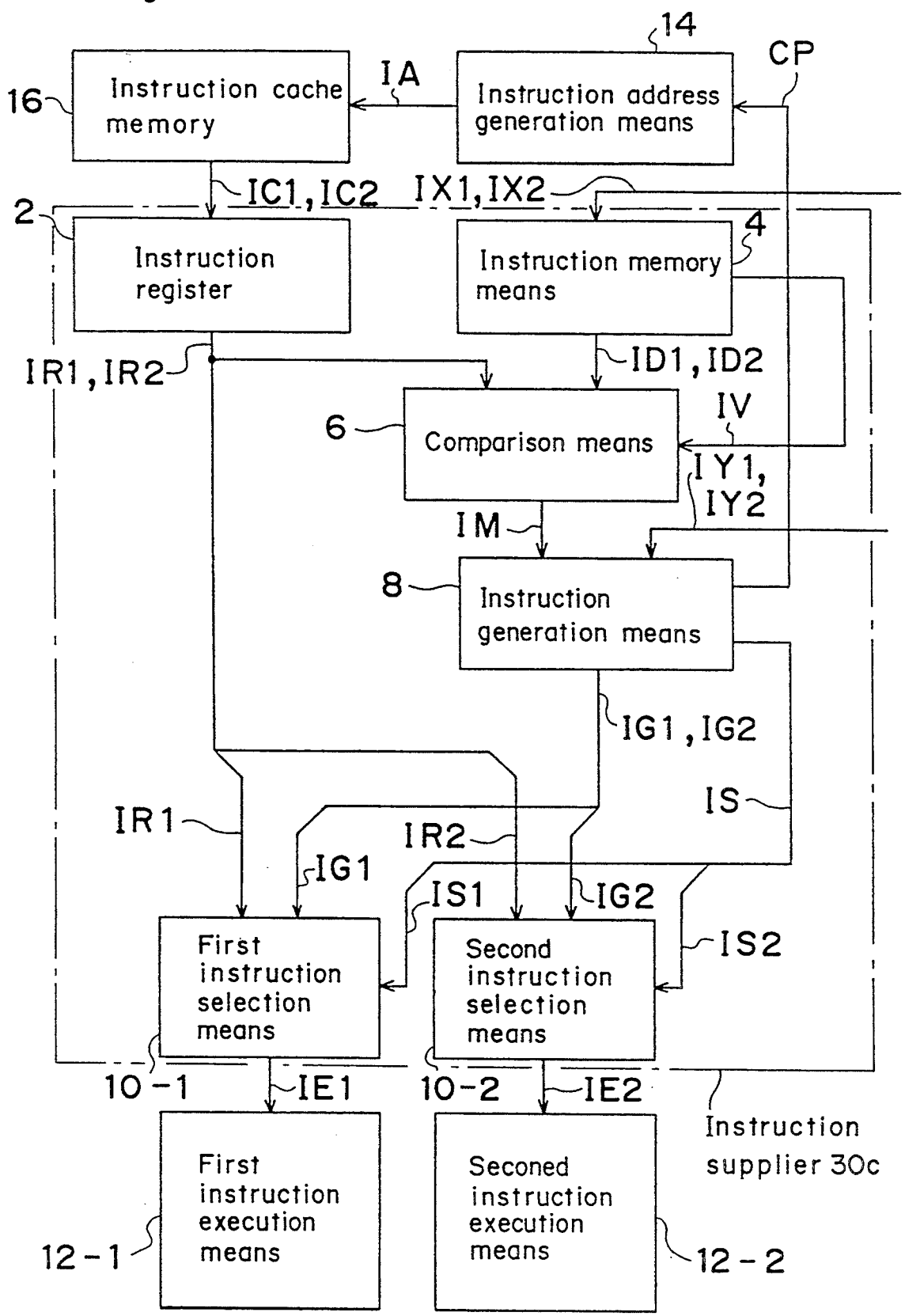
FIG. 4 is a block diagram of an instruction supplier according to a fourth preferred embodiment of the present invention.

FIG. 4 is a block diagram showing an instruction supplier 30c according to a fourth preferred embodiment of the present invention. The instruction supplier 30c is characterized in that the instruction register 2 stores two or more instructions. That is, the instruction supplier 30c is applied to a super-scaler type microprocessor comprising a plurality of instruction execution means for simultaneously executing a plurality of instructions. In order to simplify the explanation, a description will be made of a case where the instruction register 2 stores two instructions, that is, two instruction execution means are provided.

First of all, a usual sequence will be described below. At an instruction fetch stage, an instruction address IA generated by an instruction address generation means 14 is transferred to an instruction cache memory 16 to access it, and then, two instructions IC1 and IC2, read out from the instruction cache memory 16, are stored in an instruction register 2. Since an instruction memory means 4 is in an initial state when no functional error operation takes place, the instruction memory means 4 outputs a comparison enabling bit IV having an "L" level (in a disabled state) so that the comparison means 6 does not compare data read out from the instruction memory means 4 with the contents IR1 and IR2 of the instruction register 2. In this case, since an instruction generation means 8 does not generate an instruction IG1 or instructions IG1 and IG2, the instruction generation means 8 outputs a control signal IS1 having an "L" level and a control signal IS2 having an "L" level, respectively, to the first and second instruction selection means 10-1 and 10-2 so that the contents IR1 and IR2 of the instruction register 2 are respectively selected by the first instruction selection means 10-1 and the second instruction selection means 10-2. Thereafter, the first and second instruction selection means 10-1 and 10-2 respectively output the contents IR1 and IR2 of the instruction register 2 to a first instruction execution means 12-1 and a second instruction execution means 12-2 as instructions IE1 and IE2 to be executed for the next cycle (at an instruction analyzing stage).

Next, in the case where a functional error operation is found at an evaluation stage of a microprocessor, for example, when it is found that a functional error operation takes place unless specific instructions such as the instructions I01 and I02 are executed immediately after execution of the instructions I11 and I12, first of all, the instructions I11 and I12 are written into the instruction memory means 4 in accordance with instructions IX1 and IX2 and also the comparison enabling bit IV is set to an "H" level so as to enable the comparison means 6 to operate. In this case, since there is a case where it is not necessary to compare all of the 64 bits of instructions I11 and I12 (for example, a register number specified by an instruction) therewith, a mask register (not shown) for specifying bits to be compared may be provided to set a value therein, thereby specifying an instruction to be detected. In this case, it is possible to write a value in the mask register in accordance with an instruction. Furthermore, in accordance with instructions IY1 and IY2, the instruction generation means 8 generates instructions I01 and I02.

By this operation, the comparison means 6 checks for each cycle whether or not the contents IR1 and IR2 of the instruction register 2 agree with the contents ID1 and ID2 of the instruction memory means 4. When the comparison means 6 detects the agreement, it sets the agreement detection signal IM to the "H" level and transfers it to the instruction generation means 8. The instruction generation means 8 generates the instructions I01 and I02. On the other hand, a selection signal IS for selecting instructions is transferred to the instruction selection means 10-1 and 10-2 from the instruction generation means 8. In accordance with the selection signal IS, either the contents IR1 and IR2 of the instruction register 2 or the contents IG1 and IG2 are selected by the first instruction selection means 10-1 and the second instruction selection means 10-2, respectively. The instruction generation means 8 transfers the selection signals IS1 having an "H" level and IS2 having an "H" level respectively to the first and second instruction selection means 10-1 and 10-2 so that the instructions IG1 and IG2 outputted from the instruction generation means 8 are inserted for the next cycle where the instructions I11 and I12 are transferred to the first and second instruction execution means 12-1 and 12-2, respectively, and also the instruction generation means 8 generates and outputs the control signal CP having an "H" level to the instruction address generation means 14 and the instruction register 2 in order to stop an instruction fetch operation for the next cycle. In accordance with signals such as the control signal CP having an "H" level, the agreement detection signal IM is reset, thereby making the program flow return to the usual instruction sequence.

When the instructions I01 and I02 are supplied to the first and second instruction execution means 12-1 and 12-2, respectively, the instruction fetch operation is resumed by setting all of the selection signals IS1 and IS2 and setting the control signal CP to an "L" level, and then, the instruction address generation means 14 generates an address IA so as to access the instruction cache memory 16.

In the above-mentioned operation, although the functional error operation is prevented by inserting the instructions I01 and I02 for the next cycle of the instructions I11 and I12, there may be a case where a functional error operation takes place by simultaneously executing the instructions I11 and I12. In this case, the instructions I01 and I02 may be supplied in accordance with a NOP instruction by such instruction.

Needless to say, the instruction memory means 4 of FIG. 4 can be realized by the composition shown in FIG. 11.

Needless to say, the comparison means 6 of FIG. 4 can be realized by the composition shown in FIG. 12.

Needless to say, the instruction generation means 8 of FIG. 4 can be realized by the composition shown in FIG. 13.

Needless to say, the instruction selection means 10 of FIG. 4 can be realized by the composition shown in FIG. 14.

Figure 9:
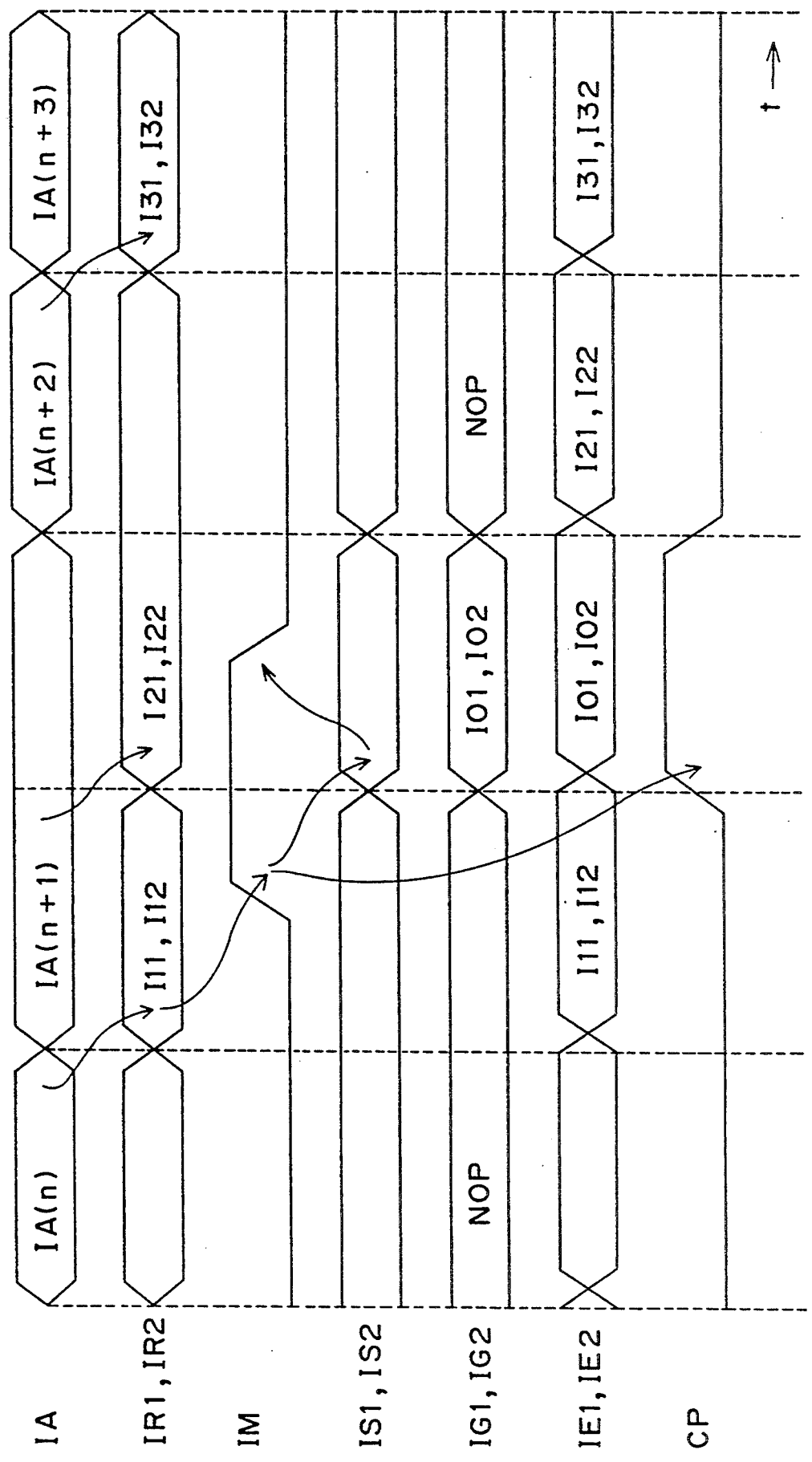
FIG. 9 is a timing chart showing waveforms of signals of the instruction supplier according to the fourth preferred embodiment.

FIG. 9 is a timing chart showing signals of the instruction supplier according to the fourth preferred embodiment of the present invention. For an instruction fetch operation, the instruction address generation means 14 generates an instruction address IA for each cycle so as to access the instruction cache memory 16. The instruction register 2 stores the instructions I11 and I12 at an instruction address IA(n), stores the instructions I21 and I22 at an instruction address IA(n+1), and stores the instructions I31 and I32 at an instruction address IA(n+1), sequentially. On the other hand, the instructions I11 and I12 are stored by the instruction memory means 4. In order to execute the instructions I01 and I02 immediately after execution of the instructions I11 and I12, when the instructions I01 and I02 are detected by the comparison means 6, the comparison means 6 generates the agreement detection signal IM having an "H" level and transfers it to the instruction generation means 8. Then, the instruction generation means 8 generates the instructions I01 and I02, and also transfers the control signal IS having an "H" level to the instruction selection means 10 so that the instructions I01 and I02 are respectively outputted to the first and second instruction execution means 12-1 and 12-2 for the next cycle of the instructions I11 and I12. By the above operation, a functional error operation of the microprocessor arising from a specific instruction sequence (for instance, a case where instructions other than the instructions I01 and I02 are executed immediately after execution of the instructions I11 and I12) can be prevented.

Simultaneously with the above operation, the instruction generation means 8 generates a control signal CP for controlling the instruction address generation means 14 and the instruction register 2 so as to enable the instruction register 2 to hold the instructions I21 and I22 therein for the next cycle, and then, suspends the access to the instruction cache memory 16 by stopping the generation of the instruction address IA.

Although FIG. 4 shows a case where the instruction register 2 and the instruction memory means 4 store only two instructions, needless to say, the instruction supplier 30c may comprises two or more instruction memory means, a plurality of comparison means corresponding to respective instruction memory means, and an instruction generation means for generating a plurality of instructions corresponding to outputs of respective comparison means. As is clear from the above description, the instruction supplier of the present preferred embodiment can cope with a case where a functional error operation takes place unless specific instructions are executed immediately after execution of certain instructions.

Fifth Preferred Embodiment

Figure 5:
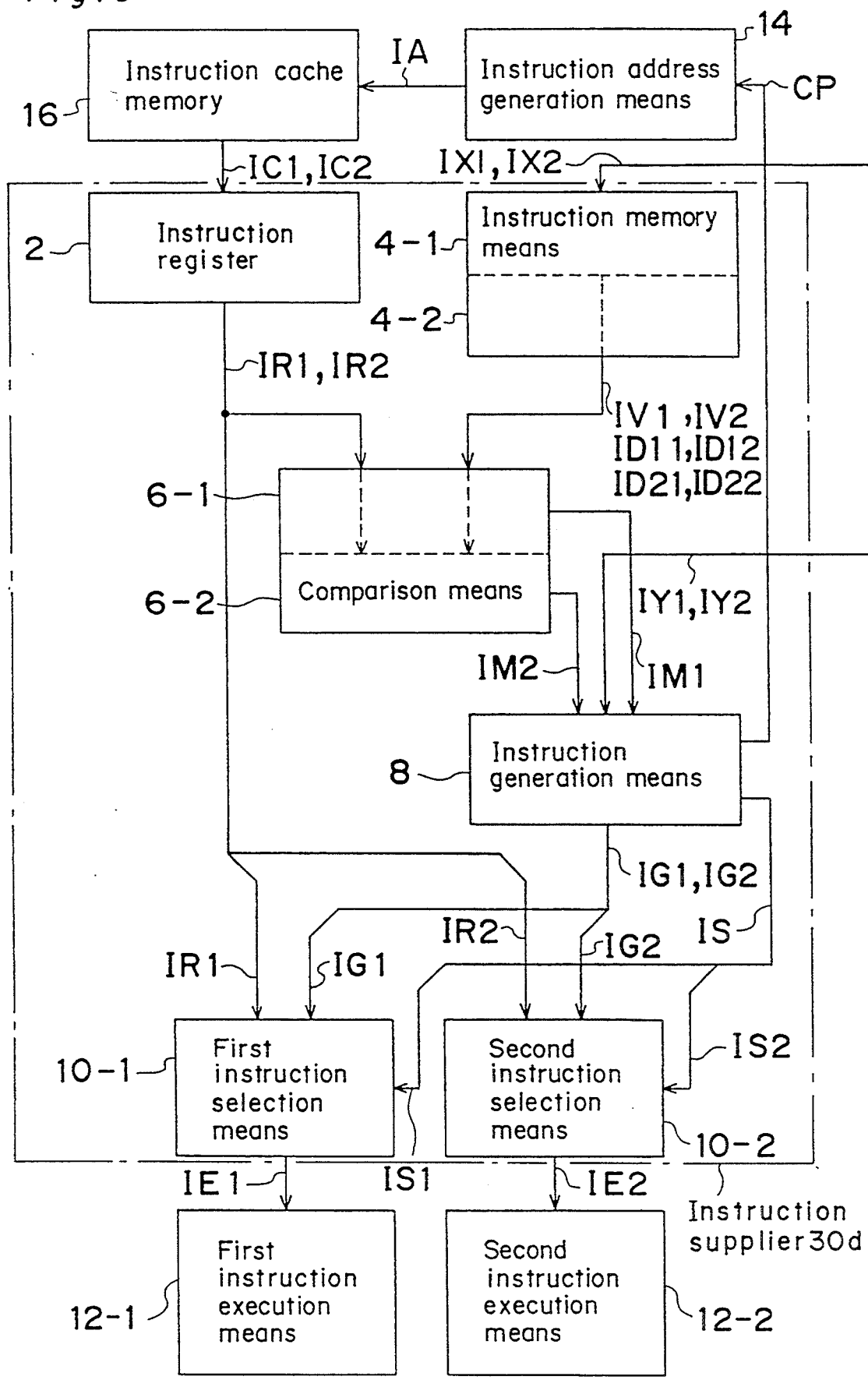
FIG. 5 is a block diagram of an instruction supplier according to a fifth preferred embodiment of the present invention.

FIG. 5 is a block diagram showing an instruction supplier according to a fifth preferred embodiment of the present invention. The instruction supplier of the fifth preferred embodiment is characterized in that two or more instructions are stored in an instruction register 2, that is, a super-scaler type microprocessor comprises a plurality of instruction execution means for simultaneously executing a plurality of instructions. In the present preferred embodiment, in order to simplify the explanation, there is described below a case where the instruction register 2 stores two instructions, namely, two instruction execution means are provided. Also, the fifth preferred embodiment shows a case where four instructions are stored by the instruction memory means 4. Although it is assumed in the third and fourth preferred embodiments that a functional error operation may take place when instructions other than the specified instructions are executed immediately after execution of certain instructions, these preferred embodiments do not always prevent all the functional error operations arising from an instruction sequence.

In the case where a functional error operation takes place when specific two instructions are executed continuously, the preferred embodiments shown in FIGS. 3 and 4 can not prevent the above-mentioned functional error operations. In order to solve these problems, the fifth preferred embodiment is provided.

In FIG. 5, the same sections as those shown in FIGS. 1 to 4 are denoted by the same reference numerals as those shown in FIGS. 1 to 4. As shown in FIG. 5, the instruction supplier of the fifth preferred embodiment comprises an instruction register 2, a first instruction memory means 4-1, a second instruction memory means 4-2, a first comparison means 6-1, a second comparison means 6-2, a instruction generation means 8, a first instruction selection means 10-1, and a second instruction selection means 10-2. There is further provided a first instruction execution means 12-1, a second instruction execution means 12-2, an instruction address generation means 14, and an instruction cache memory 16.

Figure 10:
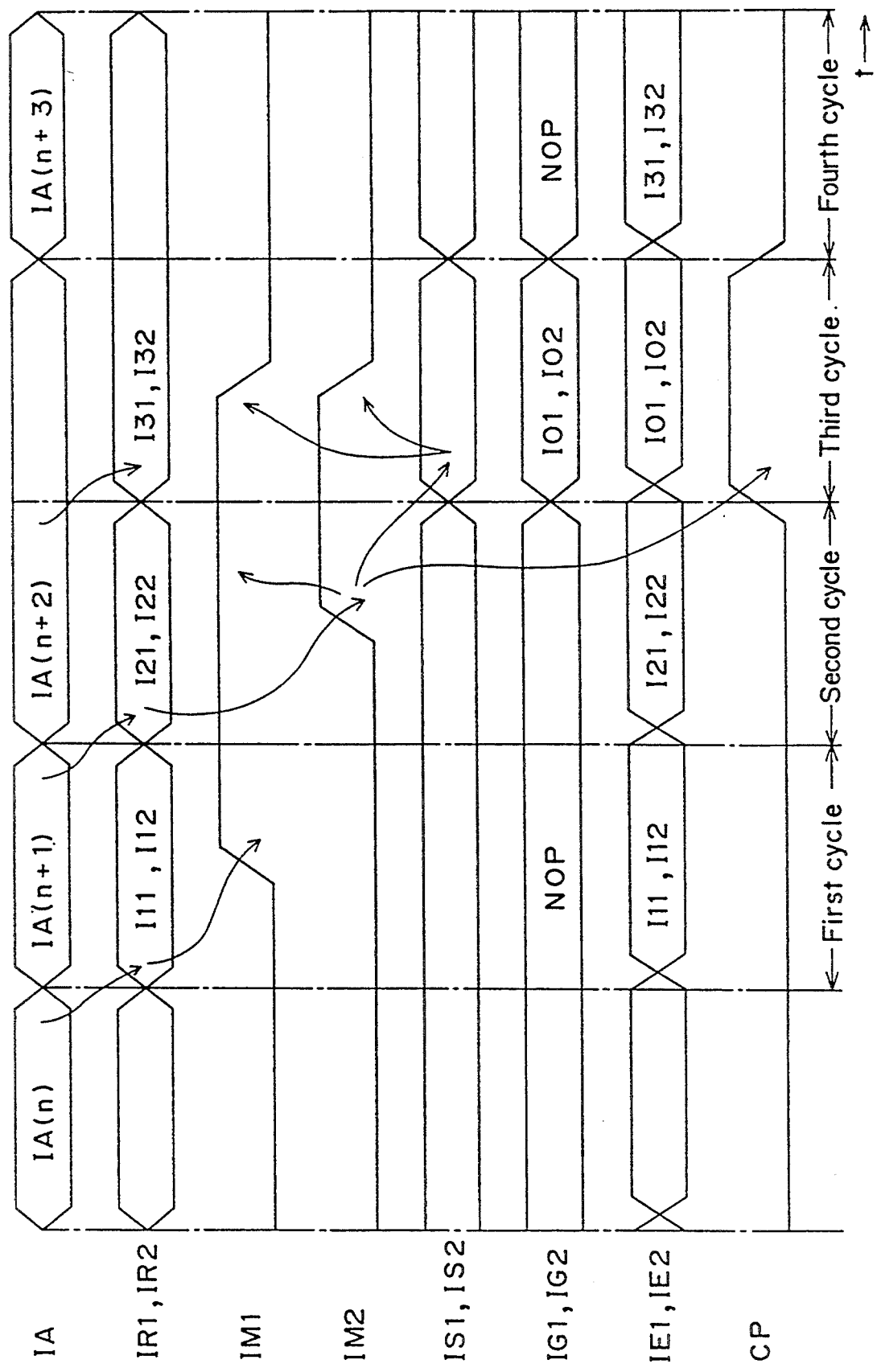
FIG. 10 is a timing chart showing waveforms of signals of the instruction supplier according to the fifth preferred embodiment.

FIG. 10 is a timing chart showing signals of the instruction supplier of the fifth preferred embodiment, in such a case where a functional error operation takes place when specific two instructions are executed continuously.

Referring to FIGS. 5 and 10, in this case, it is assumed that a functional error operation takes place when instructions I11 and I12 are executed for the first cycle, instructions I21 and I22 are executed for the second cycle and instructions I31 and I32 are executed for the third cycle. First of all, the instructions I11 and I12 are written into the first instruction memory means 4-1 in accordance with instructions IX1 and IX2, and then, a comparison enabling bit IV1 is set. Next, in accordance with instructions IX3 and IX4, the instructions I21 and I22 are written into the second instruction memory means 4-2, and then, a comparison enabling bit IV2 is set. Thereafter, in accordance with the instructions IY1 and IY2, the instruction generation means 8 generates the instructions I01 and I02. By this operation, the first comparison means 6-1 determines for each cycle whether or not the contents IR1 and IR2 of the instruction register 2 agree with the contents ID11 and ID12 (for example, instructions I11, I12) of the first instruction memory means 4-1. When the agreement is detected by the first comparison means 6-1, the second comparison means 6-2 determines for the next cycle of the detection of the first comparison means 6-1 whether or not the contents IR1 and IR2 of the instruction register 2 agree with the contents ID21 and ID22 (for instance, the instructions I21 and I22) of the second instruction memory means 4-2. When the agreement is also detected by the second comparison means 6-2, the instruction generation means 8 generates instructions IG1 and IG2 (for example, the instructions I01 and I02), and outputs them to the first instruction execution means 12-1 and the second instruction execution means 12-2, thereby generating instructions for detecting the instruction sequence as assumed above and preventing a functional error operation.

As a basic concept, a functional error operation can be prevented by outputting for the third cycle the instructions I01 and I02 generated by the instruction generation means 6 as the instructions so as to execute them in the first and second instruction execution means 12-1 and 12-2, respectively. At that time, the instructions I11 and I12 are detected by the first detection means 6-1, and then, the first agreement detection signal IM1 is set to an "H" level. Next, the instructions I21 and I22 are detected by the second comparison means 6-2, and then, the second agreement detection signal IM2 is set to an "H" level. In this case, unless the second agreement detection signal IM2 is not set, the first agreement detection signal IM1 is reset.

When both the agreement detection signals IM1 and IM2 become an "H" level, the selection signals IS1 and IS2 are respectively set to an "H" level for the third cycle, and also for the third cycle, the first and second instruction selection means 10-1 and 10-2 respectively select the instructions I01 and I02 generated by the instruction generation means 8, and output them to the first and second instruction execution means 12-1 and 12-2, respectively. At the same time, the instruction generation means 8 sets the control signal CP to an "H" level so as to stop the operation of the instruction address generation means 14. In accordance with signals such as the control signal CP having an "H" level, the first and second agreement detection signals IM1 and IM2 are reset, whereby the program flow returns to the usual sequence.

Needless to say, the instruction memory means 4-1 and 4-2 of FIG. 5 can be realized by the composition shown in FIG. 11.

Needless to say, the comparison means 6 of FIG. 5 can be realized by the composition shown in FIG. 15.

Needless to say, the instruction generation means 8 in FIG. 5 can be realized by the composition shown in FIG. 13.

Needless to say, the instruction selection means 10-1 and 10-2 can be realized by the composition shown in FIG. 14.

Furthermore, it is not necessary to detect instruction sequence exceeding the stage number of the internal pipeline of the microprocessor, generally speaking with respect to a functional error operation arising from the instruction sequence. For example, if the internal pipeline of the microprocessor has four stages (for example, four stages composed of an instruction fetch, a load, an execution and a store), it is not necessary to detect an sequence comprising five instructions.

As is clear from the above description, the instruction supplier of the fifth embodiment can prevent a functional error operation arising from a specific instruction sequence comprising a plurality of cycles.

Although the above description with reference to FIG. 5 is made of such a case where the instruction register 2 stores only two instructions and the instruction memory means 4 stores only four instructions, needless to say, the instruction supplier of the present preferred embodiment may comprises four or more instruction memory means, a plurality of comparison means corresponding to respective instruction memory means, and an instruction generation means for generating a plurality of instructions corresponding to outputs of respective comparison means. As is clear from the above explanation, the instruction supplier of the present preferred embodiment can cope with such a case where a functional error operation takes place unless specific instructions are executed immediately after execution of a specific instruction sequence including a plurality of cycles.

In the description of the above first to fifth preferred embodiments, the instruction generation means 8 does not generate instructions when the comparison enabling bit has an "L" level (in the disabled state). However, the instruction generation means 8 may always generate a NOP instruction when the comparison enabling bit has an "L" level.

In the above preferred embodiments, in order to simplify the description thereof, the word length of one instruction is assumed to be of a fixed length of 32 bits. However, needless to say, in the case of a variable length, the same effect is obtained.

As a concrete embodiment, there is no specific limitation so long as the above-described operation is realized by an embodiment. For example, the above-mentioned instruction memory means 4 and the comparison means 10 or 10-1 and 10-2 may be realized by using an associative memory device. Furthermore, since the instruction generation means 8 is realized using a method of reading out stored data, it can be constituted by a normal memory which is well known to those skilled in the art.

Figure 17:
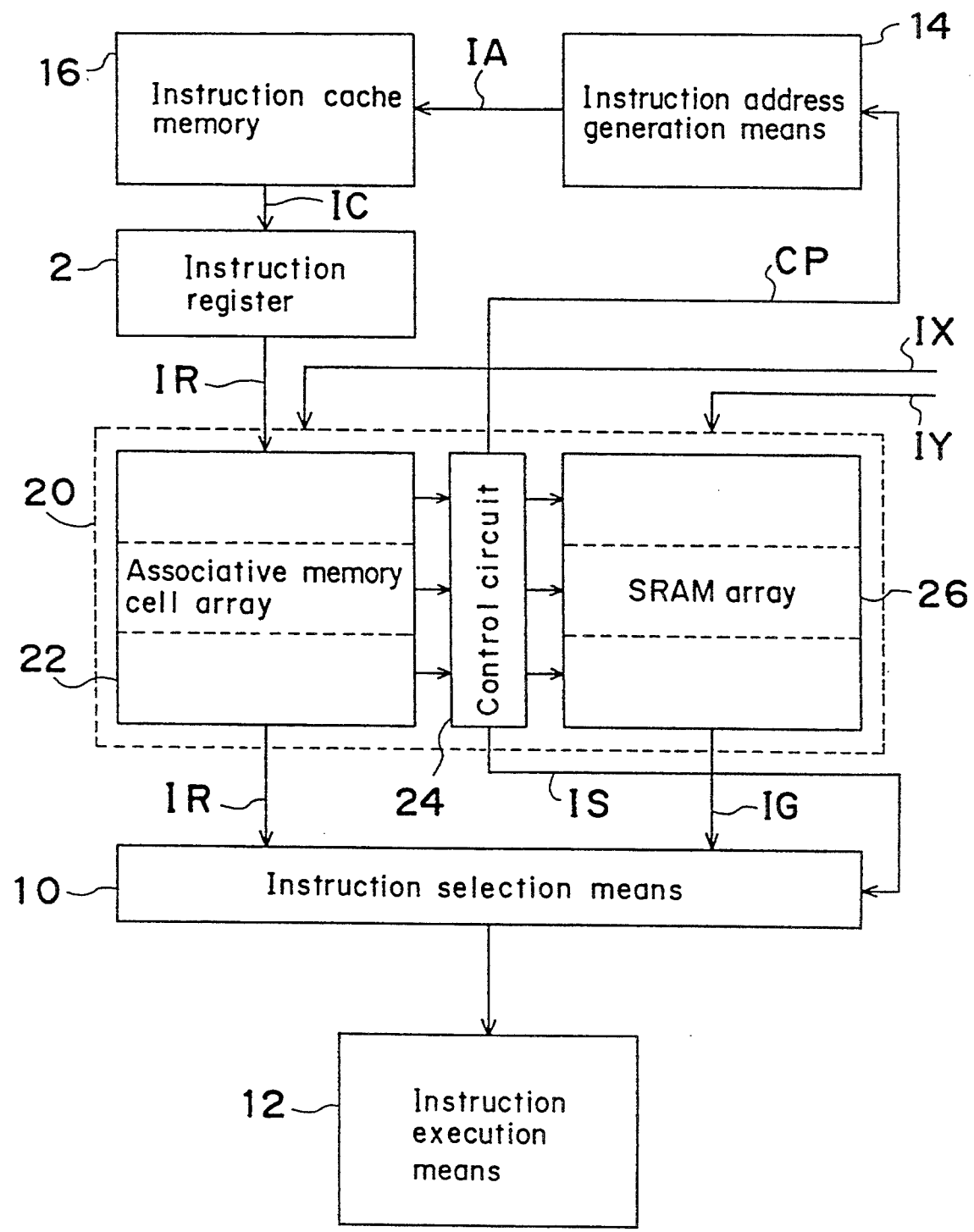
FIG. 17 is a circuit diagram showing concrete circuitry when an associative memory device is used in the instruction supplier according to the present invention.

FIG. 17 shows an embodiment in which an associative memory device 20 are used as the above instruction memory means 4, the above comparison means 10 and the above instruction generation means 8. The associative memory device 20 comprises an associative memory cell array 22, a control circuit 24 and an SRAM cell array 26. The associative memory cell array 22 has the functions of the instruction memory means 4 and the comparison meas 10, while the SRAM cell array 26 has the function of the instruction generation means 8. The control circuit 24 generates, based on the comparison result of the associative memory cell array 22, the control signals CP and IS, and a word selection signal for reading out data from the SRAM cell array 26. At the above-mentioned arrangement, the associative memory cell array 22 compares a stored instruction with the output IR of the instruction register 2. When the agreement is detected, the associative memory cell array 22 generates for the next cycle the word selection signal to be outputted to the SRAM cell array 26, so as to generate an instruction. Simultaneously, the control circuit 24 generates a control signal CP for suspending generation of an instruction address and a selection signal IS to be outputted to the instruction selection means 10, thereby supplying an instruction to the instruction execution means 12 so as to obtain a correct operation.

Sixth Preferred Embodiment

Figure 18:
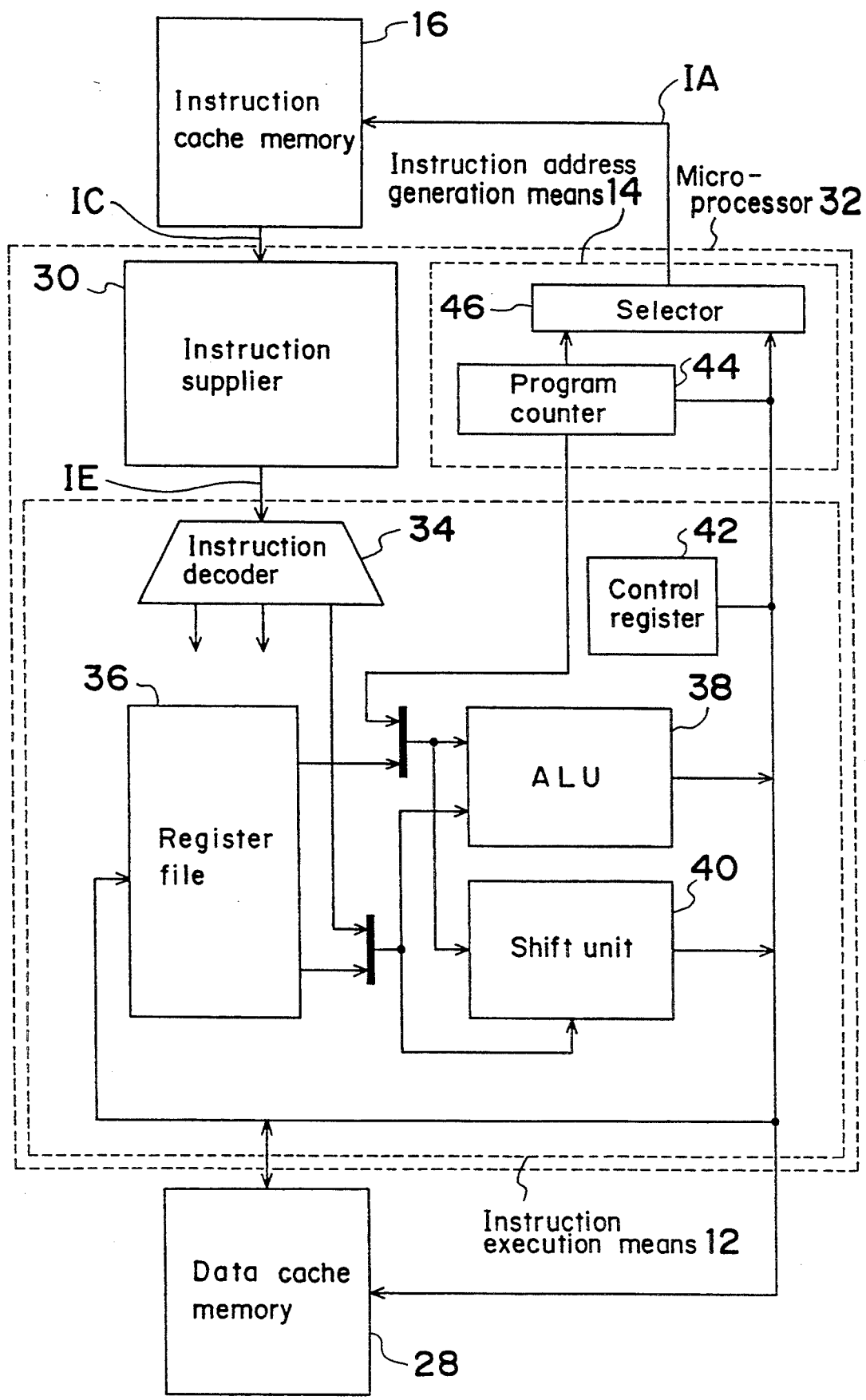
FIG. 18 is a block diagram showing a construction of a microprocessor comprising an instruction supplier according to a sixth preferred embodiment of the present invention.

FIG. 18 shows a microprocessor 32 comprising an instruction supplier 30. Referring to FIG. 18, there is provided the microprocessor 32, an instruction cache memory 16 and a data cache memory 28.

The microprocessor 32 fundamentally comprises an instruction supplier 30 for outputting an instruction IE to be executed to an instruction decoder 34 of an instruction execution means 12, an instruction address generation means 14 for generating and outputting an instruction address IA to the instruction cache memory 16, and the instruction execution means 12 for executing the outputted instruction IE.

The concrete compositions of the instruction supplier 30 are shown in FIGS. 1 to 5, and the instruction supplier 30 comprises the instruction register 2, the instruction memory means 4, the comparison means 4, the instruction generation means 8 and the instruction selection means 10 as shown in FIGS. 1 to 5.

The instruction execution means 12 comprises the instruction decoder 34 for decoding the instruction IE outputted from the instruction supplier 30, a register file 36 for temporarily storing data to be handled relating to the instruction IE, an arithmetic and logic unit (referred to as an ALU hereinafter) 38 for calculating addresses on a load instruction and a store instruction, calculating a branching address on a branching instruction and executing an arithmetic logical calculation, a shift unit 40 for executing a shift calculation of data in accordance with a shift instruction, and a control register 42 for outputting a signal for indicating an internal state of the microprocessor 32.

The instruction address generation means 14 comprises a program counter 44 for sequentially counting an address of an instruction which is being executing at presence, and a selector 46 for selecting an address upon executing an instruction using a branching address in accordance with a branching instruction, thereby outputting an instruction IA to the instruction cache memory 16.

In the microprocessor 32 constructed as described above, data stored in the data cache memory 28 are accessed using a data address calculated by the ALU 38 of the instruction execution means 12, and the instruction is executed by executing a reading-out operation of necessary data (executing a load instruction) or executing a writing-in operation of necessary data (executing a store instruction).

Since the instruction supplier 30 is provided in the microprocessor 32, it is possible to find a specific instruction sequence when a functional error operation takes place at an evaluation stage of the microprocessor 32, and output an instruction for preventing the functional error operation.

As is clear from the foregoing description, it is possible to detect a specific instruction sequence arising a functional error operation, without changing software such as an operating system or a compiler when the functional error operation arises from simultaneous execution of specific instruction sequences or instructions which are found in an evaluation stage of a microprocessor. Therefore, the instruction supplier of the present invention can supplies instruction so that no functional error operation takes place by altering the above specific instruction sequence, thereby shortening a developing time of the microprocessor, etc.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. An instruction supplier for supplying instructions in sequence to a microprocessor comprising:
    an instruction memory unit for storing instructions corresponding to instruction addresses;
    an instruction register for temporarily storing therein an instruction read out from said instruction memory unit in accordance with an inputted instruction address;
    an error causing instruction memory means for storing therein at least one error causing instruction for causing a functional error operation to occur in said microprocessor if the error causing instruction is executed at this point in the sequence of instructions;

at least one comparison means for detecting whether or not at least one error causing instruction stored in said error causing instruction memory means agrees with the instruction stored in said instruction register, respectively, by comparing at least portions of said two stored instructions, and for outputting an agreement detection signal, said agreement detection signal being at a first level when said comparison means has detected that at least one error causing instruction stored in said error causing instruction memory means agrees with the instruction stored in said instruction register and said agreement detection signal being at a second level which is different from said first level when said comparison means has detected that at least one error causing instruction stored in said error causing instruction memory means fails to agree with the instruction stored in said instruction register;

an instruction generation means for generating at least one specific instruction in accordance with the agreement detection signal outputted from said comparison means being at said first level; and an instruction selection means for selecting and outputting the instruction stored in said instruction register to said microprocessor in response to the agreement detection signal being at said second level, and for selecting and outputting the specific instruction generated by said instruction generation means to said microprocessor in response to the agreement detection signal being at said first level, thereby preventing any functional error operation from taking place in said microprocessor.

2. The instruction supplier as claimed in claim 1, wherein an instruction is written into said instruction member unit in accordance with an inputted writing-in instruction.

3. The instruction supplier as claimed in claim 1, wherein the instruction generated by said instruction generation means is altered in accordance with an inputted instruction.

4. An instruction supplier for supplying instructions in sequence to a microprocessor comprising:

an instruction memory unit for storing instructions corresponding to instruction addresses;

an instruction register for temporarily storing therein an instruction read out from said instruction memory unit in accordance with an inputted instruction address for each cycle;

an error causing instruction memory means for storing therein at least two error causing instructions including first and second error causing instructions, each error causing instruction causing a functional error operation to occur in said microprocessor if the error causing instruction is executed at this point in the sequence of instructions;

a first comparison means for detecting whether or not the first error causing instruction stored in said error causing instruction memory means agrees with the instruction stored for a first cycle in said instruction register by comparing at least portions of said stored first error causing instruction and said instruction stored in said instruction register, and for outputting a first agreement detection signal, said first agreement detection signal being at a first level when said first comparison means has detected that at least one error causing instruction stored in said error causing instruction memory means agrees with the instruction stored in said instruction register and said first agreement detection signal being at a second level which is different from said first level when said first comparison means has detected that at least one error causing instruction stored in said error causing instruction memory means fails to agree with the instruction stored in said instruction register;

a second comparison means for detecting whether or not the second error causing instruction stored in said error causing instruction memory means agrees with the instruction stored for a second cycle in said instruction register, respectively, by comparing at least portions of said second error causing instruction and said instruction stored in said instruction register, and for outputting a second agreement detection signal, said second agreement detection signal being at said first level when said second comparison means has detected that at least one error causing instruction stored in said error causing instruction memory means agrees with the instruction stored in said instruction register and said second agreement detection signal being at said second level which is different from said first level when said second comparison means has detected that at least one error causing instruction stored in said error causing instruction memory means fails to agree with the instruction stored in said instruction register;

an instruction generation means for generating a specific instruction in accordance with the first agreement detection signal outputted from said first comparison means and the second agreement detection signal outputted from said second comparison means being at said first level; and an instruction selection means for selecting and outputting the instruction stored in said instruction register for the first cycle, and for selecting and outputting the instruction stored in said instruction register for the second cycle, and for selecting and outputting the specific instruction generated by said instruction generation means for a third cycle, thereby preventing any functional error operation from occurring in said microprocessor.

5. The instruction supplied as claimed in claim 4, wherein an instruction is written into said instruction member unit in accordance with an inputted writing-in instruction.

6. The instruction supplier as claimed in claim 4, wherein the instruction generated by said instruction generation means is altered in accordance with an inputted instruction.

7. An instruction supplier for supplying instructions in sequence to a microprocessor comprising:

an instruction memory unit for storing instructions corresponding to instruction addresses;

an instruction register for temporarily storing therein a natural number N of instructions read out from said instruction memory unit in accordance with an inputted instruction address;

an error causing instruction memory means for storing therein at least N error causing instructions, each error instruction causing a functional error operation to occur in said microprocessor if the error causing instruction is executed at this point in the sequence of instructions;

at least N comparison means for detecting whether or not the N predetermined error causing instructions among the error causing instructions stored in said error causing instruction memory means agree with the N instructions stored in said instruction register, respectively, by comparing at least portions of said stored instructions, and for outputting an agreement detection signal, said agreement detection signal being at a first level when one of said N comparison means has detected that at least one error causing instruction stored in said error causing instruction memory means agrees with the instruction stored in said instruction register and said agreement detection signal being at a second level which is different from said first level when one of said N comparison means has detected that at least one error causing instruction stored in said error causing instruction memory means fails to agree with the instruction stored in said instruction register;

an instruction generation means for generating at least one specific instruction in accordance with the agreement detection signal outputted from said comparison means being at said first level;

an instruction replacement means for replacing at least one predetermined instruction among the N instructions stored in said instruction register, with at least one specific instruction generated by said instruction generation means in accordance with the agreement detection signal being at said first level, and for outputting the replaced instructions; and an instruction selection means for selecting and outputting the N instructions stored in said instruction register to said microprocessor in response to the agreement detection signal being at said second level, and for selecting and outputting the instructions outputted from said instruction replacement means to be executed by said microprocessor in response to the agreement detection signal being at said first level, thereby preventing any functional error operation from occurring in said microprocessor.

8. The instruction supplier as claimed in claim 7, wherein an instruction is written into said instruction memory unit in accordance with an inputted writing-in instruction.

9. The instruction supplier as claimed in claim 7, wherein the instruction generated by said instruction generation means is altered in accordance with an inputted instruction.

10. An instruction supplier for supplying instructions in sequence to a microprocessor comprising:

an instruction memory unit for storing instructions corresponding to instruction addresses;

an instruction register for temporarily storing therein a natural number N of instructions read out from said instruction memory unit in accordance with an inputted instruction address;

an error causing instruction memory means for storing therein at least N error causing instructions, each error causing instruction causing a functional error operation to occur in said microprocessor if the error causing instruction is executed at this point in the sequence of instructions;

at least N comparison means for detecting whether or not the N predetermined error causing instructions among the error causing instructions stored in said instruction memory means agree with the N instructions stored in said instruction register, respectively, by comparing at least portions of said stored instructions, and for outputting an agreement detection signal, said agreement detection signal being at a first level said one of said N comparison means has detected that at least one error causing instruction stored in said error causing instruction memory means agrees with the instruction stored in said instruction register and said agreement detection signal being at a second level which is different from said first level when one of said N comparison means has detected that at least one error causing instruction stored in said error causing instruction memory means fails to agree with the instruction stored in said instruction register;

an instruction generation means for generating at least one specific instruction in accordance with the agreement detection signal outputted from said comparison means being at said first level; and N instruction selection means, each instruction selection means selecting and outputting one of the N instructions stored in said instruction register to said microprocessor in response to the agreement detection signal being at said first level, and selecting and outputting the specific instruction outputted from said instruction generation means to be executed by said microprocessor in response to the agreement detection signal being at said first level, thereby preventing any functional error operation from occurring in said microprocessor.

11. The instruction supplier as claimed in claim 10, wherein an instruction is written into said instruction memory unit in accordance with an inputted writing-in instruction.

12. The instruction supplier as claimed in claim 10, wherein the instruction generated by said instruction generation means is altered in accordance with an inputted instruction.

13. An instruction suppler for supplying instructions to a microprocessor comprising:

an instruction memory unit for storing instructions corresponding to instruction addresses;

an instruction register for temporarily storing therein a natural number N of instructions read out from said instruction memory unit in accordance with an inputted instruction address for each cycle;

an error causing instruction memory means for storing therein at least 2N error causing instructions including first N error causing instructions and second N error causing instructions, each error causing instructions causing a functional error operation to occur in said microprocessor;

a first comparison means for detecting whether or not the first N error causing instructions stored in said error causing instruction memory means agree with the N instructions stored for a first cycle in said instruction register by comparing at least portions of said stored instructions, and for outputting a first agreement detection signal, said first agreement detection signal being at a first level when said first comparison means has detected that at least one error causing instruction stored in said error causing instruction memory means agrees with the instruction stored in said instruction register and said first agreement detection signal being at a second level which is different from said first level when said first comparison means has detected that at least one error causing instruction stored in said error causing instruction memory means fails to agree with the instruction stored in said instruction register;

a second comparison means for detecting whether or not the second N error causing instructions stored in said error causing instruction memory means agrees with the N instruction stored for a second cycle in said instruction register, respectively, by comparing at least portions of the stored instructions, and for outputting a second agreement detection signal, said second agreement detection signal being at said first level when said second comparison means has detected that at least one error causing instruction stored in said error causing instruction member means agrees with the instruction stored in said instruction register and said second agreement detection signal being at said second level which is different from said first level when said second comparison means has detected that at least one error causing instruction stored in said error causing instruction memory means fails to agree with the instruction stored in said instruction register;

an instruction generation means for generating specific N instructions in accordance with the first agreement detection signal outputted from said first comparison means and the second agreement detection signal outputted from said second comparison means being at said first level; and N instruction selection means for respectively selecting and outputting the N instructions stored in said instruction register for the first cycle, and for selecting and outputting the N instructions stored in said instruction register for the second cycle, and for selecting and outputting the specific N instructions generated by said instruction generation means for a third cycle, thereby preventing any functional error operation from taking place in said microprocessor.

14. The instruction supplier as claimed in claim 13, wherein an instruction is written into said instruction member unit in accordance with an inputted writing-in instruction.

15. The instruction supplier as claimed in claim 13, wherein the instruction generated by said instruction generation means is altered in accordance with an inputted instruction.

* * * * *